(12) United States Patent
Chan et al.

(10) Patent No.: US 9,792,446 B2
(45) Date of Patent: *Oct. 17, 2017

(54) SYSTEM AND METHOD FOR PROTECTING DATA STORED ON A REMOVABLE DATA STORAGE DEVICE

(71) Applicant: Elwha LLC, Bellevue, WA (US)

(72) Inventors: Alistair K. Chan, Bainbridge Island, WA (US); Roderick A. Hyde, Redmond, WA (US); Jordin T. Kare, San Jose, CA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/147,578

(22) Filed: May 5, 2016

(65) Prior Publication Data

US 2016/0246968 A1  Aug. 25, 2016

Related U.S. Application Data

(63) Continuation of application No. 14/523,049, filed on Oct. 24, 2014, now Pat. No. 9,355,044, which is a (Continued)

(51) Int. Cl.
*G06F 21/60* (2013.01)
*G06F 21/00* (2013.01)
(Continued)

(52) U.S. Cl.
CPC .............. *G06F 21/60* (2013.01); *G06F 3/067* (2013.01); *G06F 3/0623* (2013.01);
(Continued)

(58) Field of Classification Search
CPC ....................................................... G06F 21/60
(Continued)

(56) References Cited

U.S. PATENT DOCUMENTS 5,898,783 A  4/1999  Rohrbach
5,940,773 A  8/1999  Barvesten
(Continued)

FOREIGN PATENT DOCUMENTS

TW  2011-13710 A  4/2011
WO  WO 2010/102954 A1  9/2010

OTHER PUBLICATIONS

Larson et al., Impending Device Removal Detection for Personal Computer Memory Card International Association Disk Drives, Sep. 1, 1994, IBM Technical Disclosure Bulletin, vol. 37 No. 09, pp. 51-52.
(Continued)

*Primary Examiner* — Jacob Lipman
(74) *Attorney, Agent, or Firm* — Foley & Lardner LLP

(57) ABSTRACT

A system for protecting data stored in a removable data storage device includes a personal electronic device, a removable solid state data storage device operatively coupled to the personal electronic device, and a circuit configured to protect data stored in the data storage device in response to detecting impending removal of the data storage device from the personal electronic device.

35 Claims, 19 Drawing Sheets

Related U.S. Application Data continuation of application No. 14/166,526, filed on Jan. 28, 2014, now Pat. No. 8,887,294, which is a continuation of application No. 13/664,841, filed on Oct. 31, 2012, now Pat. No. 8,661,551, which is a continuation of application No. 13/340,424, filed on Dec. 29, 2011, now Pat. No. 8,621,644.

(51) Int. Cl.
  *G06F 12/02* (2006.01)
  *G06F 12/14* (2006.01)
  *G06F 21/79* (2013.01)
  *G06F 21/88* (2013.01)
  *G06F 3/06* (2006.01)

(52) U.S. Cl.
  CPC .......... *G06F 3/0653* (2013.01); *G06F 3/0679* (2013.01); *G06F 12/0246* (2013.01); *G06F 12/1433* (2013.01); *G06F 21/00* (2013.01); *G06F 21/79* (2013.01); *G06F 21/88* (2013.01); *G06F 2221/2143* (2013.01); *G06F 2221/2153* (2013.01)

(58) Field of Classification Search
  USPC .......................................................... 726/26
  See application file for complete search history.

(56) References Cited

U.S. PATENT DOCUMENTS

| | | | |
|---|---|---|---|
| 6,223,290 | B1 | 4/2001 | Larsen et al. |
| 7,054,624 | B2 | 5/2006 | Cocita |
| 7,574,235 | B2 | 8/2009 | Tu |
| 7,640,005 | B2 | 12/2009 | Matsumoto et al. |
| 7,715,830 | B2 | 5/2010 | Cocita |
| 7,941,197 | B2 | 5/2011 | Jain et al. |
| 8,064,883 | B2 | 11/2011 | Liu |
| 2005/0186989 | A1 | 8/2005 | Cocita |
| 2005/0226072 | A1 | 10/2005 | Nakabe et al. |
| 2006/0234679 | A1 | 10/2006 | Matsumoto et al. |
| 2007/0021103 | A1 | 1/2007 | Zhao et al. |
| 2007/0178881 | A1 | 8/2007 | Teunissen et al. |
| 2008/0022418 | A1 | 1/2008 | Wei |
| 2008/0080322 | A1* | 4/2008 | Miyazaki ................ G11B 7/28 369/1 |
| 2008/0194296 | A1 | 8/2008 | Roundtree |
| 2008/0215841 | A1 | 9/2008 | Bolotin et al. |
| 2008/0293397 | A1 | 11/2008 | Gajdos et al. |
| 2009/0063802 | A1 | 3/2009 | Johnson et al. |
| 2009/0143048 | A1 | 6/2009 | Ayanamcottil et al. |
| 2009/0191846 | A1 | 7/2009 | Shi |
| 2009/0216982 | A1 | 8/2009 | Johnson et al. |
| 2009/0248966 | A1 | 10/2009 | Crandell |
| 2009/0249443 | A1 | 10/2009 | Fitzgerald et al. |
| 2009/0249460 | A1 | 10/2009 | Fitzgerald et al. |
| 2009/0251282 | A1 | 10/2009 | Fitzgerald et al. |
| 2009/0253408 | A1 | 10/2009 | Fitzgerald et al. |
| 2009/0290555 | A1* | 11/2009 | Alpert ..................... H04W 4/20 370/331 |
| 2009/0299699 | A1* | 12/2009 | Wu ........................ H04R 29/00 702/186 |
| 2010/0037063 | A1 | 2/2010 | Chontos et al. |
| 2010/0062744 | A1 | 3/2010 | Ibrahim |
| 2010/0090831 | A1 | 4/2010 | Zhao et al. |
| 2010/0099379 | A1 | 4/2010 | Pon et al. |
| 2010/0185874 | A1* | 7/2010 | Robles ................ G06F 21/6218 713/189 |
| 2010/0287373 | A1 | 11/2010 | Johnson et al. |
| 2010/0312965 | A1 | 12/2010 | Cooke et al. |
| 2011/0010517 | A1 | 1/2011 | Fujimura et al. |
| 2011/0047604 | A1 | 2/2011 | Bolotin et al. |

OTHER PUBLICATIONS

European Patent Office, Supplementary European Search Report, Pursuant to Rule 62 EPC; App. No. EP 12861846; Oct. 6, 2015; pp. 1-7.

PCT International Search Report; International App. No. PCT/US 12/71214; Mar. 5, 2013; pp. 1-2.

European Patent Office, Communication Pursuant to Article 94(3) EPC; App. No. EP 12 861 846.9-1870; Sep. 9, 2016; pp. 1-5.

* cited by examiner

SYSTEM AND METHOD FOR PROTECTING DATA STORED ON A REMOVABLE DATA STORAGE DEVICE

CROSS-REFERENCE TO RELATED PATENT APPLICATIONS

This application is a continuation of U.S. application Ser. No. 14/523,049, filed Oct. 24, 2014, which is a continuation of U.S. application Ser. No. 14/166,526, filed Jan. 28, 2014, now U.S. Pat. No. 8,887,294, which is a continuation of U.S. application Ser. No. 13/664,841, filed Oct. 31, 2012, now U.S. Pat. No. 8,661,551, which is a continuation of U.S. application Ser. No. 13/340,424, filed Dec. 29, 2011, now U.S. Pat. No. 8,621,644, all of which are incorporated herein by reference in their entireties.

BACKGROUND

The present application relates generally to the field of removable data storage devices. More specifically, the present application relates to the field of systems and methods for protecting data on a removable data storage device.

People store personal information, photographs, and other sensitive data on personal electronic devices, e.g., mobile phones, smart phones, tablet computers, etc. If the personal electronic device is lost or stolen, the information and data may be revealed, which could have a devastating effect on the device owner and others. Accordingly, several systems and methods enable a user to remotely wipe the memory of a smart phone. However, if the sensitive data is stored on a removable data storage device, e.g., SIM card, flash memory card, etc., wiping the memory of the smart phone may be ineffective in protecting the stored data. Thus, there is a need to protect data stored on a removable data storage device.

SUMMARY

One embodiment relates to a system for protecting data stored in a removable data storage device including a personal electronic device, a removable solid state data storage device operatively coupled to the personal electronic device, and a circuit configured to protect data stored in the data storage device in response to detecting impending removal of the data storage device from the personal electronic device.

Another embodiment relates to a removable data storage device including a circuit configured to respond to detecting impending removal of the removable data storage device from a personal electronic device by protecting data stored in the removable data storage device.

Another embodiment relates to a personal electronic device including a circuit configured to protect data stored in a removable solid state data storage device in response to detecting impending removal of the data storage device from the personal electronic device.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the figures, a system and method for protecting data on a removable data storage device, and components thereof, are shown according to various exemplary embodiments. The removable data storage device includes a memory configured to store data. The removable data storage device may further include a power source and may be operatively coupled to a personal electronic device. The system includes a circuit configured to respond to the removal of the removable data storage device from the personal electronic device by protecting at least some of the data stored in the memory of the removable data storage device. The data may be protected in a variety of ways described more fully below, including deletion, encryption, alteration, corruption, etc. The circuit may be located on the removable data storage device, the personal electronic device, or some combination thereof. The systems and methods described more fully below may cause the data to be protected after the removable data storage device has been removed from the personal electronic device, as the data storage device is being removed, or before the data storage device is removed. For example, the circuit may be configured to detect impending removal of the data storage device from the personal electronic device. According to one embodiment, the system may allow for preauthorization of removal of the data storage device. In such an embodiment, the system may not protect the data or provide a lower level of protection of the data if the removal has been preauthorized. It should be noted that the arrows in the figures generally indicate the direction of motion for the removable data storage device to be removed from the personal electronic device.

For purposes of this disclosure, the term "coupled" means the joining of two members directly or indirectly to one another. Such joining may be stationary in nature or moveable in nature and such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
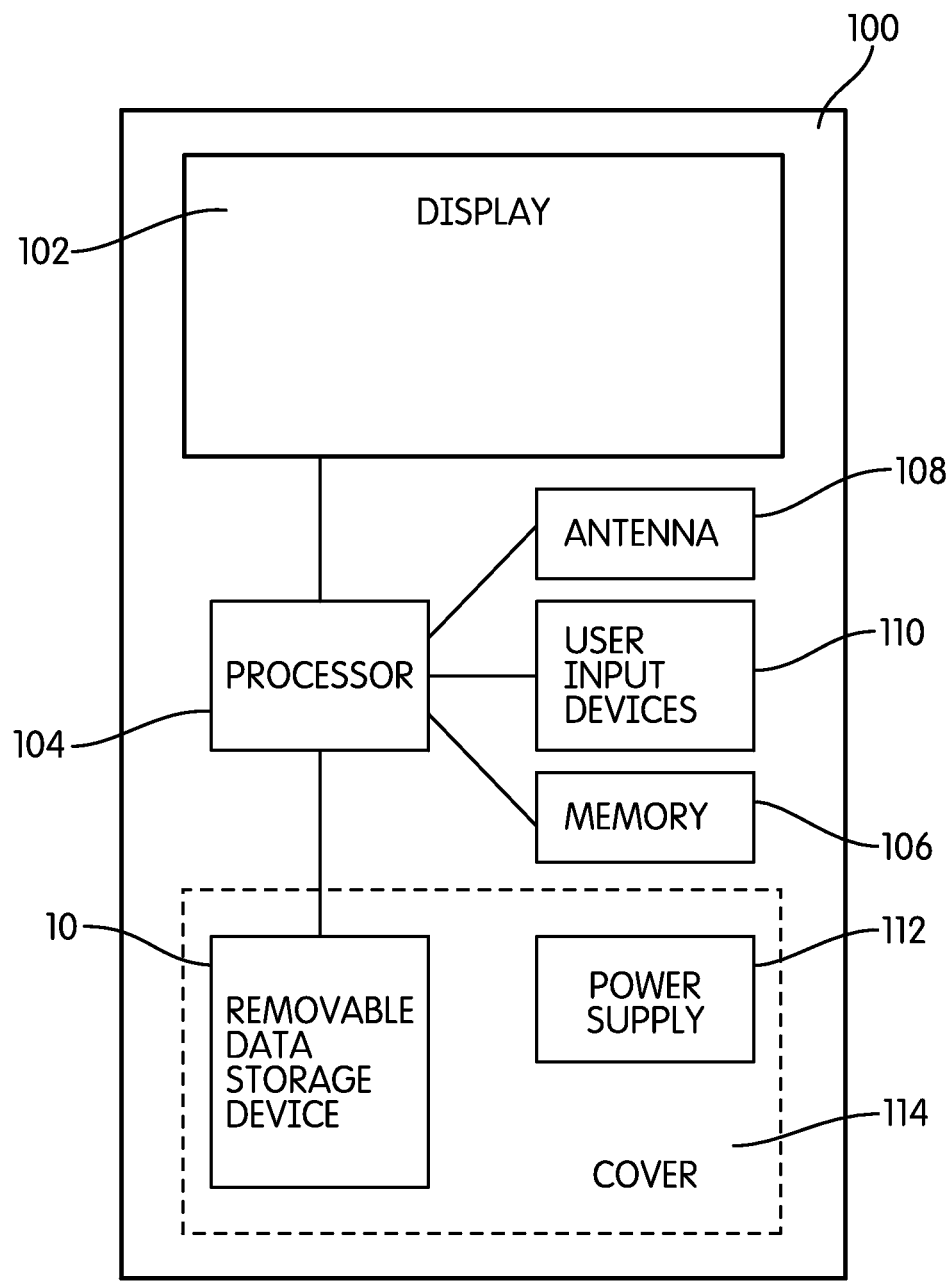
FIG. 1 is a schematic block diagram of a personal electronic device and a removable data storage device, shown according to an exemplary embodiment.

Referring to FIG. 1, an exemplary embodiment of a system for protecting data stored on a removable data storage device is shown according to an exemplary embodiment. A removable data storage device 10 (e.g., a Subscriber Identity Module (SIM), a Secure Digital (SD) memory card, an integrated circuit (IC) memory, a Universal Serial Bus (USB) drive, a Universal Integrated Circuit Card (UICC), a Removable User Identity Module (R-UIM), a thumb drive, a flash drive, solid state storage device, etc.) may be operatively coupled to a personal electronic device 100 (e.g., a mobile phone, a smart phone, a personal digital assistant, a pager, a personal computer, a laptop computer, a tablet computer, a handheld computer, a camera, an audio recording device, etc.) The personal electronic device 100 is shown to include a display 102, a processor 104, a memory 106 located on-board the personal electronic device 100, an antenna 108, and a user input device 110. According to various embodiments, the user input device 110 may include a keypad, a keyboard, a touch sensitive screen, a toggle switch, a rotary selector, a trackball, a camera, a fingerprint scanner, etc. Processor 104 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 104 may be configured to execute computer code stored in memory 106 to complete and facilitate the activities described herein. Memory 106 can be any volatile or non-volatile memory device capable of storing data or computer code relating to the activities described herein. The personal electronic device 100 is further shown to include a power supply 112 configured to supply power to the personal electronic device 100 and components thereof. According to an exemplary embodiment, the power supply 112 is a battery. According to other embodiments, the power supply 112 may be a transformer or a distributor of external power, for example, if the personal electronic device 100 is plugged into a power outlet (e.g., wall socket, solar pad, etc.). The personal electronic device 100 may further include a cover 114, which may be removably coupled to the personal electronic device 100 and configured to protect one or more components of the personal electronic device 100 from environmental hazards (e.g., liquid, impact, debris, electrical shock, etc.). Depending on the configuration and purpose of the personal electronic device 100, the personal electronic device 100 may or may not include all of the components described above.

Figure 2:
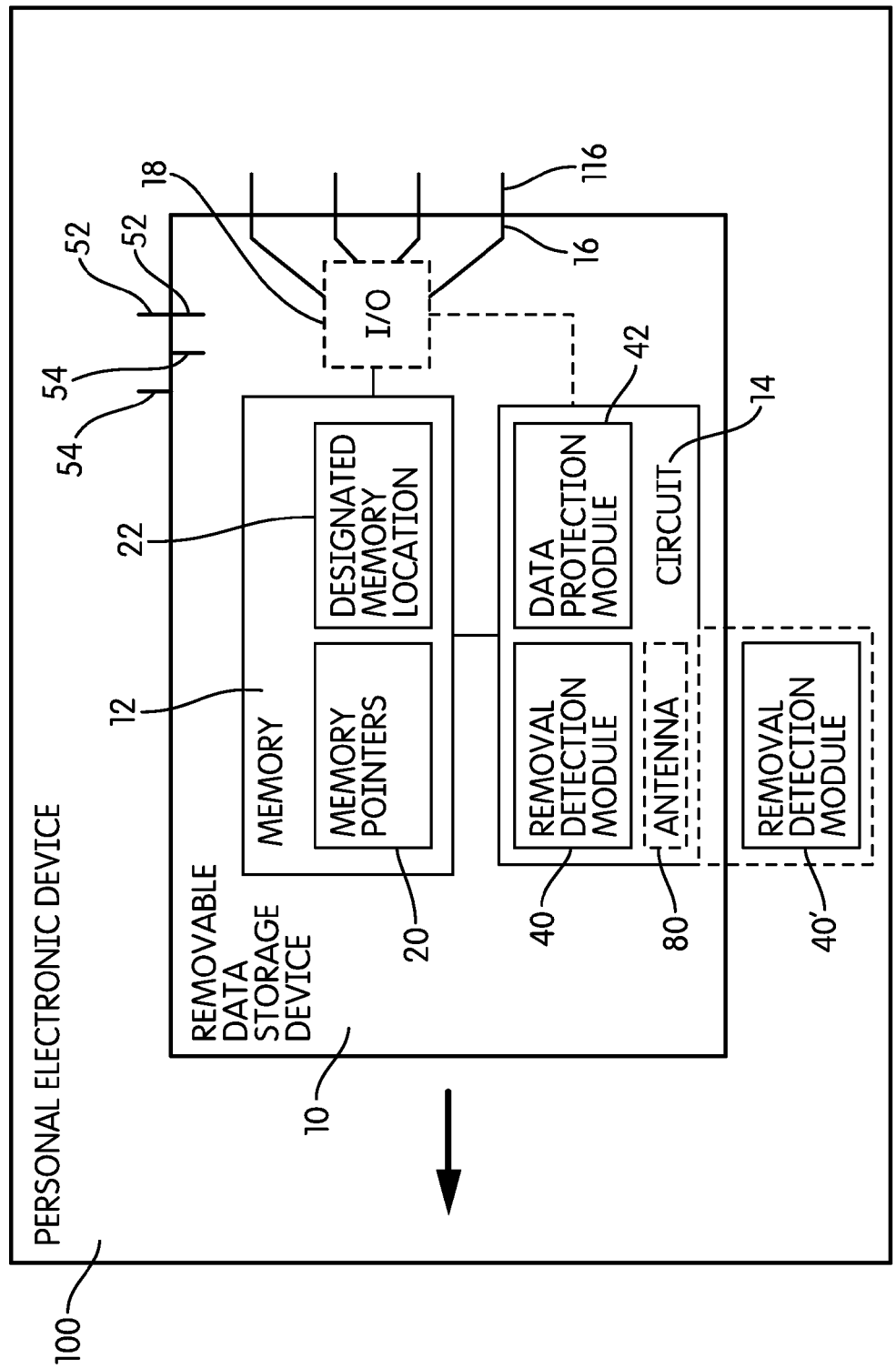
FIG. 2 is a detailed block diagram of the removable data storage device and personal electronic device of FIG. 1, shown according to an exemplary embodiment.

Referring to FIG. 2, a detailed block diagram of a removable data storage device 10 is shown, according to an exemplary embodiment. The removable data storage device 10 is shown to include a memory 12, a circuit 14, and one or more data contacts 16. When the removable data storage device is in an installed position, the data contacts 16 couple to corresponding data contacts 116 on the personal electronic device 100 and provide an electrical pathway from the personal electronic device 100 to the components of the removable data storage device 10. An input/output (I/O) controller 18 may be operatively located between the data contacts 16 and the memory 12 or the circuit 14. The I/O controller 18 may be configured to control the distribution of data and signals into and out of the removable data storage device 10.

The memory 12 may include memory pointers 20 which may be used to locate information stored in the memory 12. For example, the I/O controller 18 or the processor 104 of the personal electronic device 100 may access the memory pointers 20 in order to locate data stored in the memory 12. The memory 12 may further include one or more designated memory locations 22. The designated memory location 22 may include a certain set or subset of bits or registers of memory 12. The designated memory locations 22 may or may not be contiguous registers.

Figure 3A:
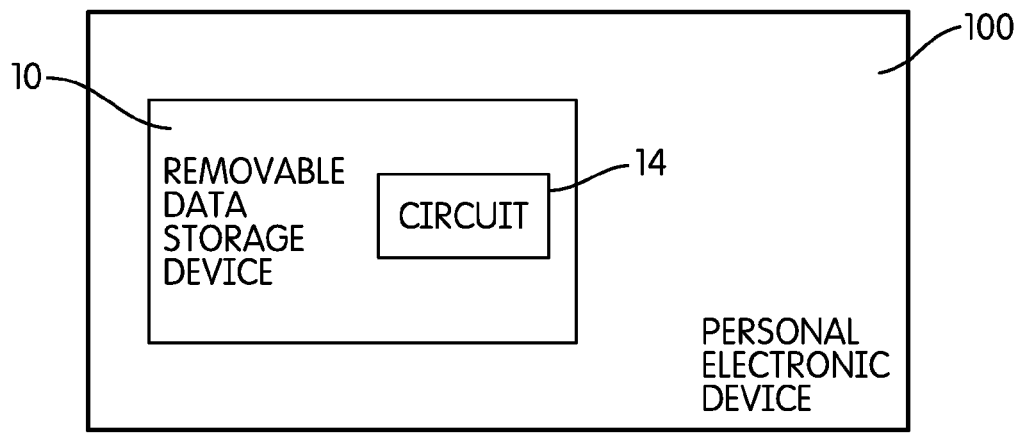
FIGS. 3A-3C are schematic block diagrams of a system for protecting data stored on a removable data storage device, shown according to an exemplary embodiment.
Figure 3B:
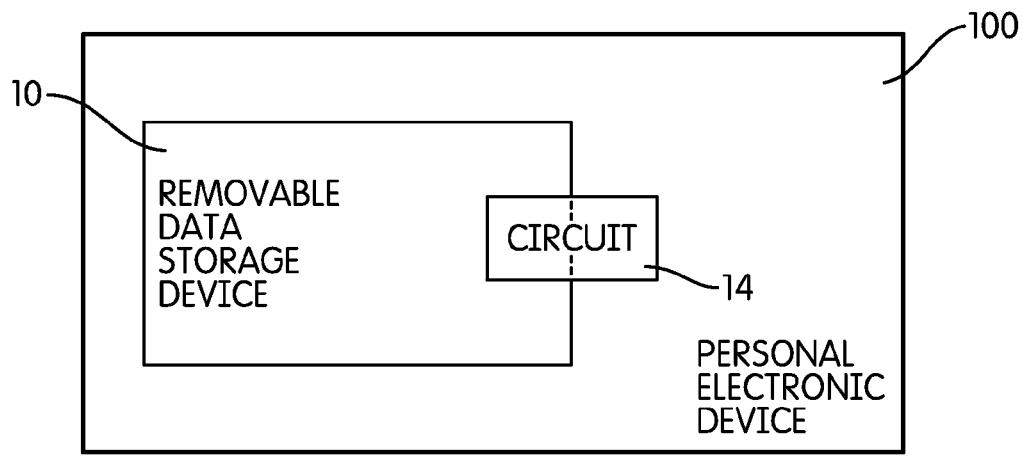
Figure 3C:
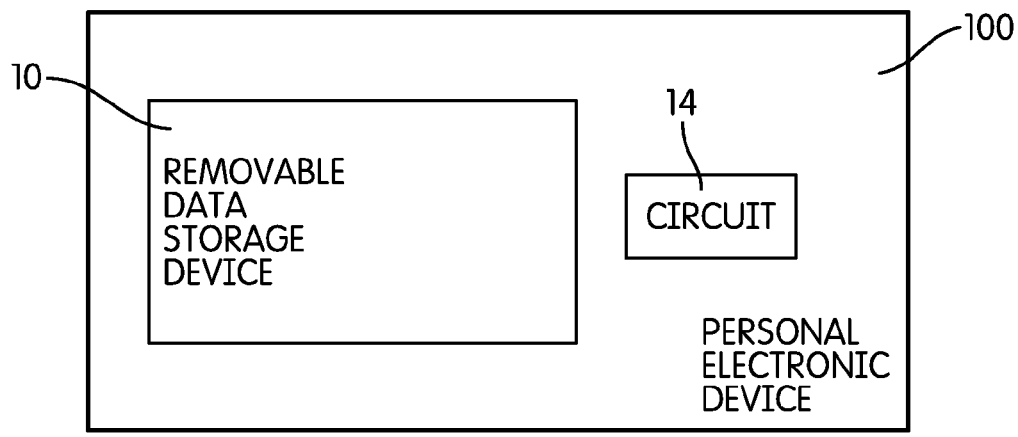

The circuit 14 may be configured to respond to the removal of the removable data storage device 10 from the personal electronic device 100 by protecting data stored in the memory 12 of the removable data storage device 10. The circuit 14 includes one or more electrical pathways and may include one or more microprocessors, an application specific integrated circuit (ASIC), a circuit containing one or more processing components, a group of distributed processing components, circuitry for supporting a microprocessor, or other hardware configured for processing. According to various embodiments, as shown in FIGS. 3A-3C, the circuit 14 may be disposed fully or partially on one or both of the removable data storage device 10 and the personal electronic device 100. According to one embodiment, the removable data storage device 10 may include a circuit 14 configured to respond to the removal of the removable data storage device 10 from a personal electronic device 100 by protecting data stored in a memory 12 of the removable data storage device 10. According to one embodiment, the circuit 14 includes an antenna 80, which may be configured for communication with the personal electronic device 100 (e.g., after the removable data storage device 10 has been removed from the personal electronic device 100) or with another electronic device.

Further referring to the block diagrams of exemplary embodiments of the removable data storage device 10 shown in FIGS. 4A-4D, the circuit 14 may include one or more modules 40-44. The modules may include hardware or software components, or any combination thereof. According to one embodiment, one or more of the modules may be computer code modules (e.g., executable code, object code, source code, script code, machine code, etc.) configured for execution by a processor, which according to various embodiments may be located on-board (e.g., part of circuit 14) or off-board (e.g., processor 104) of the removable data storage device 10. According to another embodiment, one or more of the modules may be hardware components (e.g., inductors, capacitors, switches, solid state components, photocells, etc.) located onboard or offboard the removable data storage device 10.

Circuit 14 may include a removal detection module 40. According to one embodiment, the removal detection module 40 is configured to detect impending removal of the removable data storage device 10 from the personal electronic device 100. That is, the removal detection module 40 may be configured to detect that the removable data storage device 10 has not yet been completely removed (e.g., severed, disconnected, decoupled, etc.) from the personal electronic device 100; however, certain necessary conditions for the removal of the removable data storage device 10 from the personal electronic device 100 have been met. For example, the removal detection module 40 may be configured to detect that the cover 114 has been removed from the personal electronic device 100. The removal detection module 40 may be configured to detect the breaking of an electrical contact. According to one embodiment, one of the data contacts 116 may be shorter than the others such that one of the electrical contacts 16, 116 breaks before the others, or, in practice, the removable data storage device 10 may be lifted during removal such that one of the data contacts 16, 116 breaks before the others. Accordingly, the circuit 14 may have milliseconds or more to protect, or at least initiate protection, of the data stored in the memory 12 before the removable data storage device 10 is completely removed from the personal electronic device 100.

According to other embodiments, the removal detection module 40 may be configured to detect that the removable data storage device 10 has been removed from the personal electronic device 100. Depending on the configuration of the removal detection module 40 and components thereof, the removal detection module 40 may be configured to detect that the removable data storage device 10 has been completely removed from the personal electronic device 100 or that the data contacts 16, 116 have been completely severed. In practice, whether the removal detection module 40 detects impending removal of the removable data storage device 10 or that the removable data storage device 10 has been removed may depend on the configuration of the circuit 14. That is, the same components may be used for either embodiment, but their orientation may indicate impending removal, ongoing removal, or completed removal.

Whether the removal detection module 40 is configured to detect impending removal, ongoing removal, or completed removal may depend on how the rest of circuit 14 is configured to respond to the detection. For example, if impending removal is detected, the processor 104 on the personal electronic device 100 may still have time to protect the data stored on the removable data storage device 10 before it is completely removed from the personal electronic device 100. Accordingly, a substantial amount of the processing and power may be supplied by the personal electronic device 100. On the other hand, the removable data storage device 10 may be configured to include its own power supply or processing electronics; thus, the removal detection module 40 may be configured to detect that the removable data storage device 10 has been removed. It is contemplated that the removal detection module 40 may be configured to detect both impending removal and completed removal. For example, the removable data storage device 10 may have a small power supply, and the circuit 14 may be configured to begin protecting data using power from the personal electronic device 100 in response to detecting impending removal. Upon detecting that the removable data storage device 10 has been removed from the personal electronic device 100, the circuit 14 may continue to protect as much data as it can with the power it has available. According to another embodiment, the removable data storage device 10 may be configured to draw power to protect data from the next electronic device (e.g., SIM card reader, SD card reader, personal electronic device 100, etc.) that the removable data storage device 10 is coupled to after the removable data storage device 10 is removed from the personal electronic device 100.

Referring to FIG. 2, the removal detection module 40 may be configured to detect the breaking of an electrical contact 52 that couples the personal electronic device 100 to the removable data storage device 10. The removal detection module 40 may be configured to detect the making of electrical contact 54, which couples the personal electronic device 100 to the removable data storage device 10. The removal detection module 40 may be configured to detect disruption of a magnetic link between the personal electronic device 100 and the removable data storage device 10. For example, the removal detection module 40 on board the removable data storage device 10 may magnetically couple to a corresponding removal detection module 40' located on the personal electronic device 100. The removal detection module 40 may be configured to detect a change in mutual capacitance between the personal electronic device 100 and the removable data storage device 10. For example, the removal detection module 40 on board the removable data storage device 10 may capacitively couple to a corresponding removal detection module 40' located on the personal electronic device 100. The removal detection module 40 may be configured to detect a change in mutual inductance between the personal electronic device 100 and the removable data storage device 10. For example, the removal detection module 40 on board the removable data storage device 10 may inductively couple to a corresponding removal detection module 40' located on the personal electronic device 100. The removal detection module 40 may be configured to detect a differential acceleration between the personal electronic device 100 and the removable data storage device 10. For example, the removal detection module 40 on board the removable data storage device 10 may include an accelerometer. A corresponding removal detection module 40' located on the personal electronic device 100 may also include an accelerometer, or the circuit 14 may receive accelerometer information from another accelerometer installed on the personal electronic device 100. The removal detection module 40 may be configured to detect a change in orientation of the removable data storage device 10 relative to the personal electronic device 100. The removal detection module 40 may be configured to detect a change in temperature (e.g., a lowering of temperature, which may indicate a cold attack). For example, the removal detection module 40 may include a thermocouple, a thermistor, etc., or the circuit 14 may receive temperature information from a temperature measuring element installed on the personal electronic device 100. The removal detection module 40 may be configured to detect a temperature below a threshold value. For example, the removal detection module 40 may include a thermostat configured to open or close a switch at a threshold temperature.

Referring to FIGS. 5A-5D, schematic cross-sectional views of the removable data storage device 10 and the personal electronic device 100 are shown according to exemplary embodiments. In the embodiments shown in FIGS. 5A-5D, the removal detection module 40 is configured to detect exposure to light. Specifically referring to the embodiment of FIG. 5A, the removable data storage device 10 may include an optical element 46 (e.g., a light dependent resistor, a photoelectric cell, etc.) disposed on the removable data storage device 10 such that the optical element 46 faces away from the personal electronic device when the removable data storage device is in an installed position. Accordingly, when the cover 114 is removed, the optical element responds to available light. Referring to the embodiment of FIG. 5B, the removable data storage device 10 may include an optical element 46 disposed on the removable data storage device 10 such that the optical element 46 faces toward the personal electronic device 100 when the removable data storage device 10 is in an installed position. According to the embodiment shown, the optical element 46 may be exposed to available light if the removable data storage device 10 is rotated or if the removable data storage device 10 is moved over ledge 120. Referring to the embodiment of FIG. 5C, the personal electronic device 100 may include an optical element 46 disposed beneath the removable data storage device 10 such that the optical element 46 is substantially shielded from available light when the removable data storage device 10 is in an installed position. According to the embodiment shown, the optical element 46 may be exposed to available light if the removable data storage device 10 is rotated or translated. Referring to the embodiment of FIG. 5D, the removable data storage device 10 may include an optical element 46 that is located on a portion of the removable data storage device 10 that is not exposed to light until the removable data storage device 10 has been removed from the personal electronic device 100.

Figure 6A:
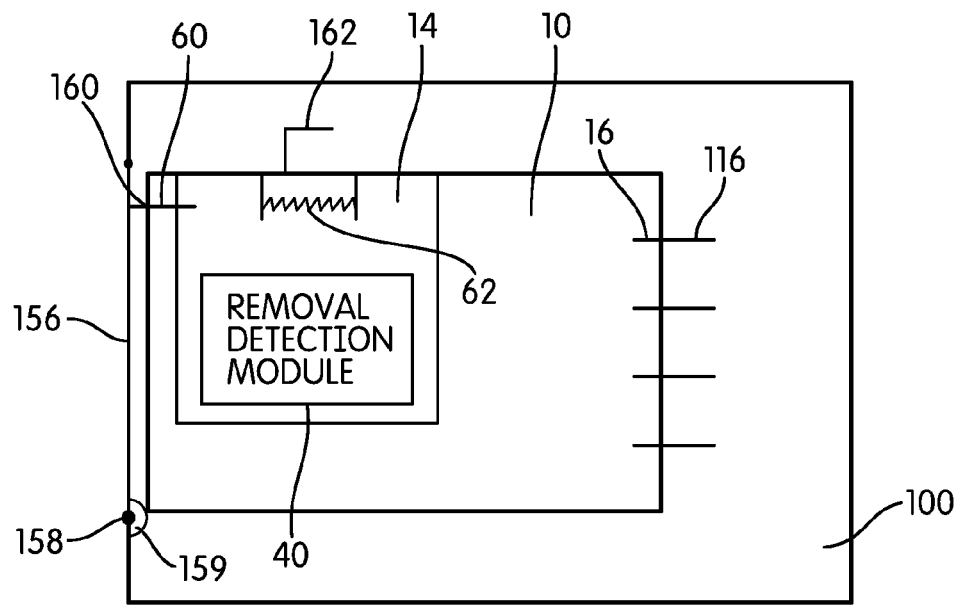
FIGS. 6A-6B are detailed schematic block diagrams of the removable data storage device and personal electronic device of FIG. 1, shown according to other embodiments.
Figure 6B:
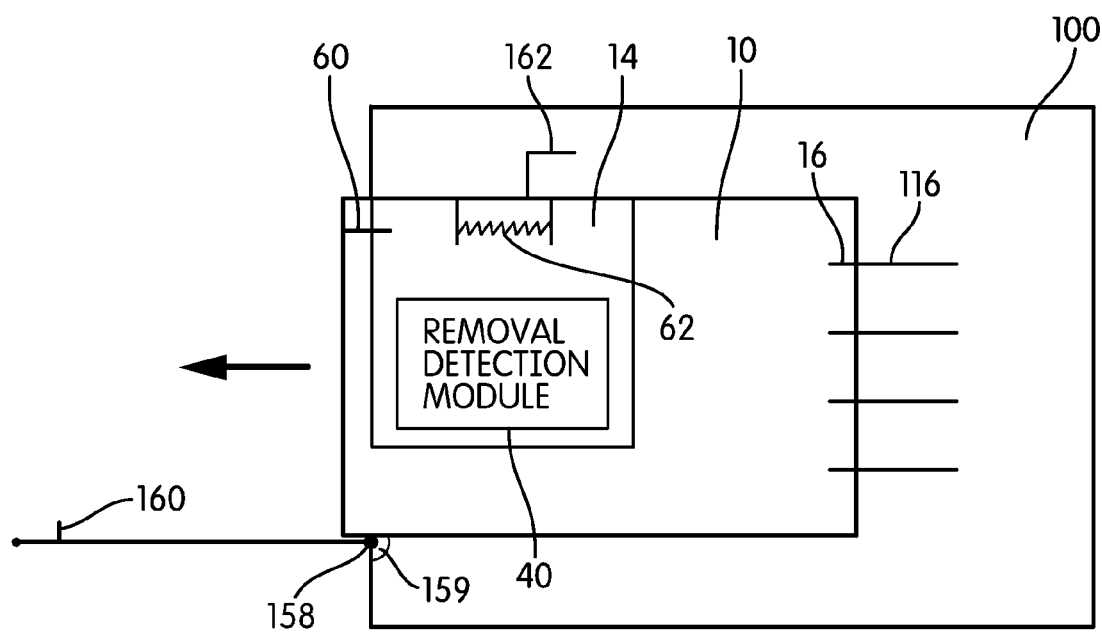

Referring to FIGS. 6A and 6B, schematic block diagrams of the removable data storage device 10 and the personal electronic device 100 are shown according to an exemplary embodiment. The personal electronic device 100 may include a member 156 (e.g., a tab, a dog, a restraint, etc.), and the removal detection module 40 may be configured to detect a change in location of the member 156 relative to the personal electronic device 100. As shown, the member 156 is moved about an axis 158 to remove the removable data storage device 10. According to one embodiment, the removal detection module 40 is configured to detect rotation of the member 156 about the axis 158, for example, via a rotation sensor 159 (e.g., hall effect sensor, potentiometer, etc.). According to the embodiment shown, the member 156 may include an electrical contact 160, which electrically couples to a contact 60 on the removable data storage device 10. The member 156 or the electrical contacts 60, 160 may be configured such that the electrical contact must be broken in order to physically access the removable data storage device 10. The removal detection module 40 may be configured to detect a change in resistance. For example, the removable data storage device 10 may include a resistor 62, and the personal electronic device 100 may include a contact 162 which electrically couples to the resistor 62. Accordingly, as the removable data storage device 10 is removed from the personal electronic device 100, the contact 162 moves relative to the resistor 62 and, thereby, changes the resistance. According to one embodiment, the removal detection module 40 is configured to detect a change in orientation of the removable data storage device 10 relative to the personal electronic device 100.

Figure 7A:
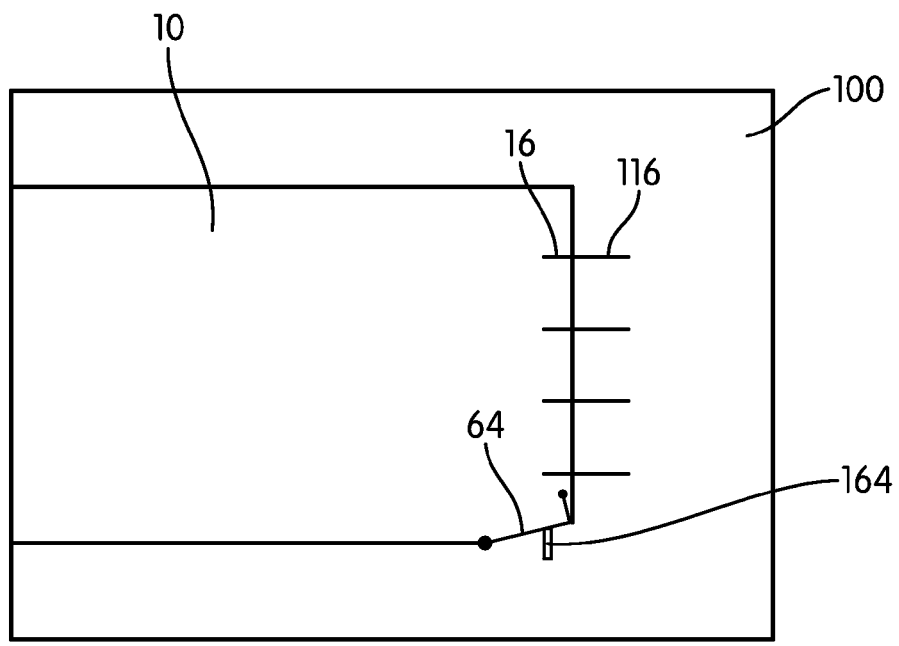
FIGS. 7A-7B are detailed schematic block diagrams of the removable data storage device and personal electronic device of FIG. 1, shown according to other embodiments.
Figure 7B:
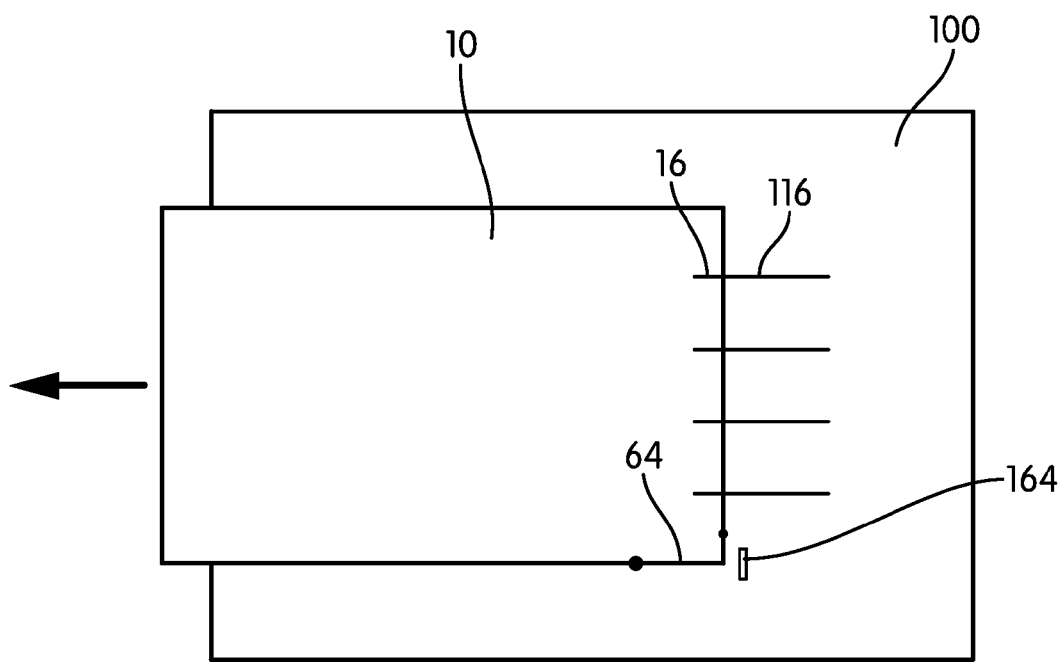

Referring to FIGS. 7A and 7B, schematic block diagrams of the removable data storage device 10 and the personal electronic device 100 are shown according to an exemplary embodiment. The removable data storage device 10 may include a member 64, and the removal detection module 40 may be configured to detect a change in location of the member 64 relative to the removable data storage device. For example, the member 64 may be depressed by a structure 164 when the removable data storage device 10 is in an installed position, and the removable data storage device 10 may be configured such that the member 64 returns to a non-depressed state when the member 64 is no longer acted upon by the structure 164.

It should be noted that the exemplary embodiments described above are examples only for the assistance of the reader, and should not be considered limiting. Other orientations and configurations are contemplated. For example, the cover 114 may have an electrical contact which must be broken in order to access the removable data storage device 10. For another example, rather than electrical contacts, the removal detection module 40 may be configured to detect the making or breaking of a mechanical contact. The mechanical contact may couple the personal electronic device 100 to the removable data storage device 10 and may be configured such that the mechanical contact must be broken in order to physically access the removable data storage device 10.

Referring to FIGS. 2-4, the circuit 14 may include a data protection module 42. According to one embodiment, the data protection module 42 may be configured to protect at least some of the data stored in the memory 12 of the removable data storage device 10. The data protection module 42 may be configured to protect the data stored in the memory 12 of the removable data storage device 10 in a variety of ways. For example, the data protection module 42 may be configured to alter, delete, overwrite, encrypt, require a password, designate requiring a password, hide, and/or hide at least some of the data stored on the removable data storage device 10. The data protection module 42 may be configured to overwrite the data a single time or multiple times. Overwriting the data multiple times reduces the possibility that the data may be recovered by forensic techniques. The data may be overwritten with all 0's, all 1's, random values, or a repeating pattern of 1's and 0's. The data protection module 42 may be configured to encrypt unencrypted data, to re-encrypt previously encrypted data (e.g., with a different key), or to increase the level of encryption (e.g., using a different algorithm, using a stronger key, etc.) of previously encrypted data. The data protection module 42 may be configured to hide at least some of the data by deleting, encrypting, or overwriting at least some of the memory pointers 20 in the memory 12. The data protection module 42 may be configured to introduce false or misleading data into at least some of the data stored in the memory of the removable data storage device 10. The data protection module 42 may be configured to prevent access to at least some of the data stored in the memory 12, for example, by requiring a password to access the data, physically disconnecting (e.g., opening a switch, closing a switch, etc.) at least some of the data stored in the memory 12 from the data contacts 16, etc. The data protection module 42 may include instructions for implementing the type of protection to be employed, for example, whether to destroy, alter, encrypt, hide, etc. the data. According to one embodiment, the data protection module 42 protects the data stored in the memory 12 in response to a signal from a removal detection module 40' on the personal electronic device 100.

According to one embodiment, the data protection module 42 may be configured to protect all of the data stored in the memory 12 of the removable data storage device 10. According to another embodiment, the data protection module 42 may be configured to protect a subset of the data stored in the memory 12 of the removable data storage device 10. According to various embodiments, the subset of data may be information required for operation of the personal electronic device 100, a password file, an encryption key, an image data, a personal information, a contact information, a telephone number information, a location information, and/or a data log. For example, the subset of data may include photographs, videos, names, addresses, phone numbers, call histories, web history, GPS location history, cell tower access history, etc. According to another embodiment, the subset of data includes data stored in a designated memory location 22. For example, an application may be configured to store particularly sensitive information in the designated memory location 22 so that it will be protected by the circuit 14. For example, a computer may synchronize the contents of a particular folder with the designated memory location 22, so that a user may place sensitive information into the particular folder, and that information will be synchronized with the designated memory location 22. Protecting the data stored in the designated memory location 22 first helps to ensure that particularly sensitive information will be protected even if limited time or power resources are available to the circuit 14. It is contemplated that while the data protection module 42 may first protect the designated memory location 22, the circuit 14 may be configured to subsequently protect additional memory locations on memory 12.

Figure 4A:
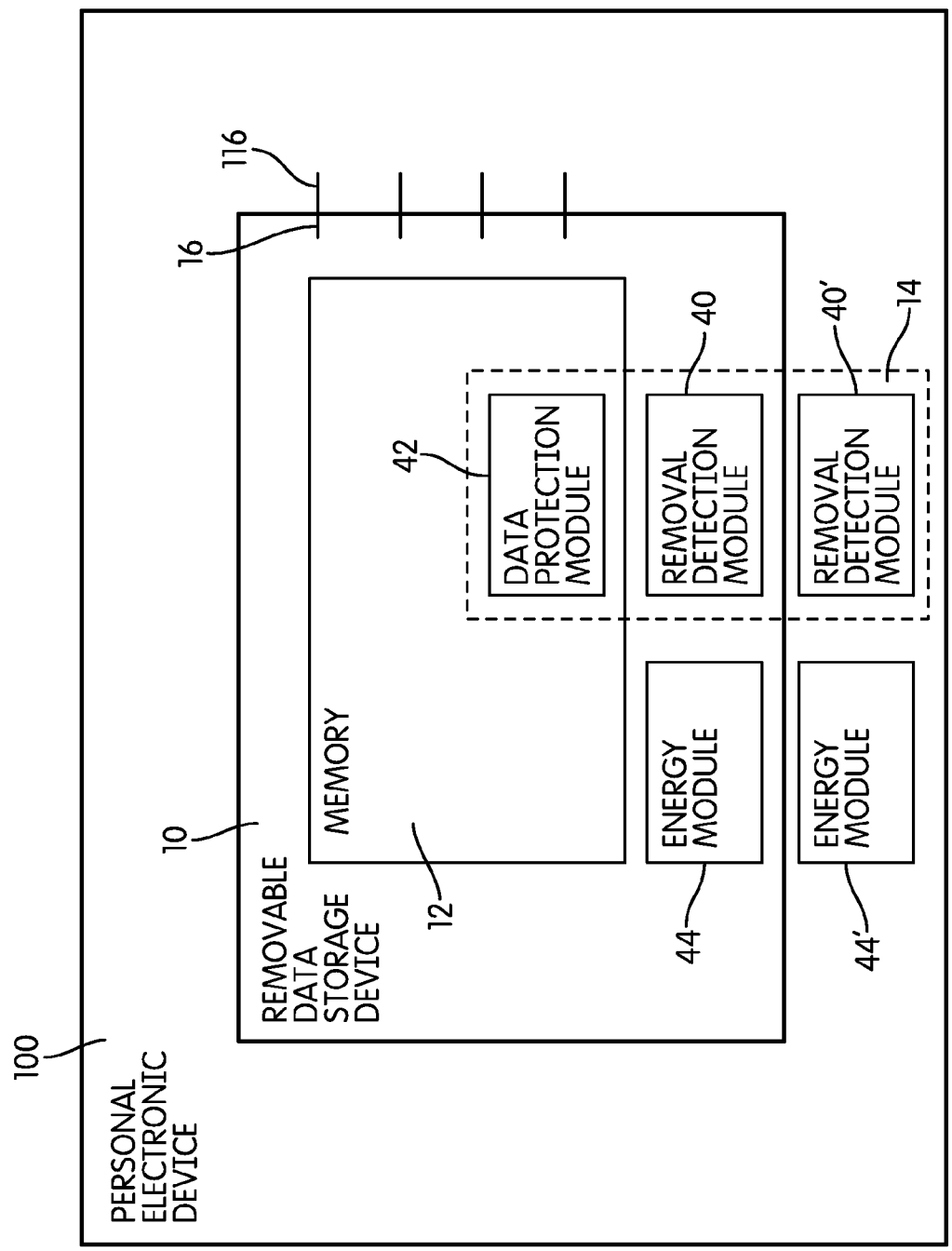
FIGS. 4A-4D are detailed schematic block diagrams of the removable data storage device and personal electronic device of FIG. 1, shown according to other embodiments.
Figure 4B:
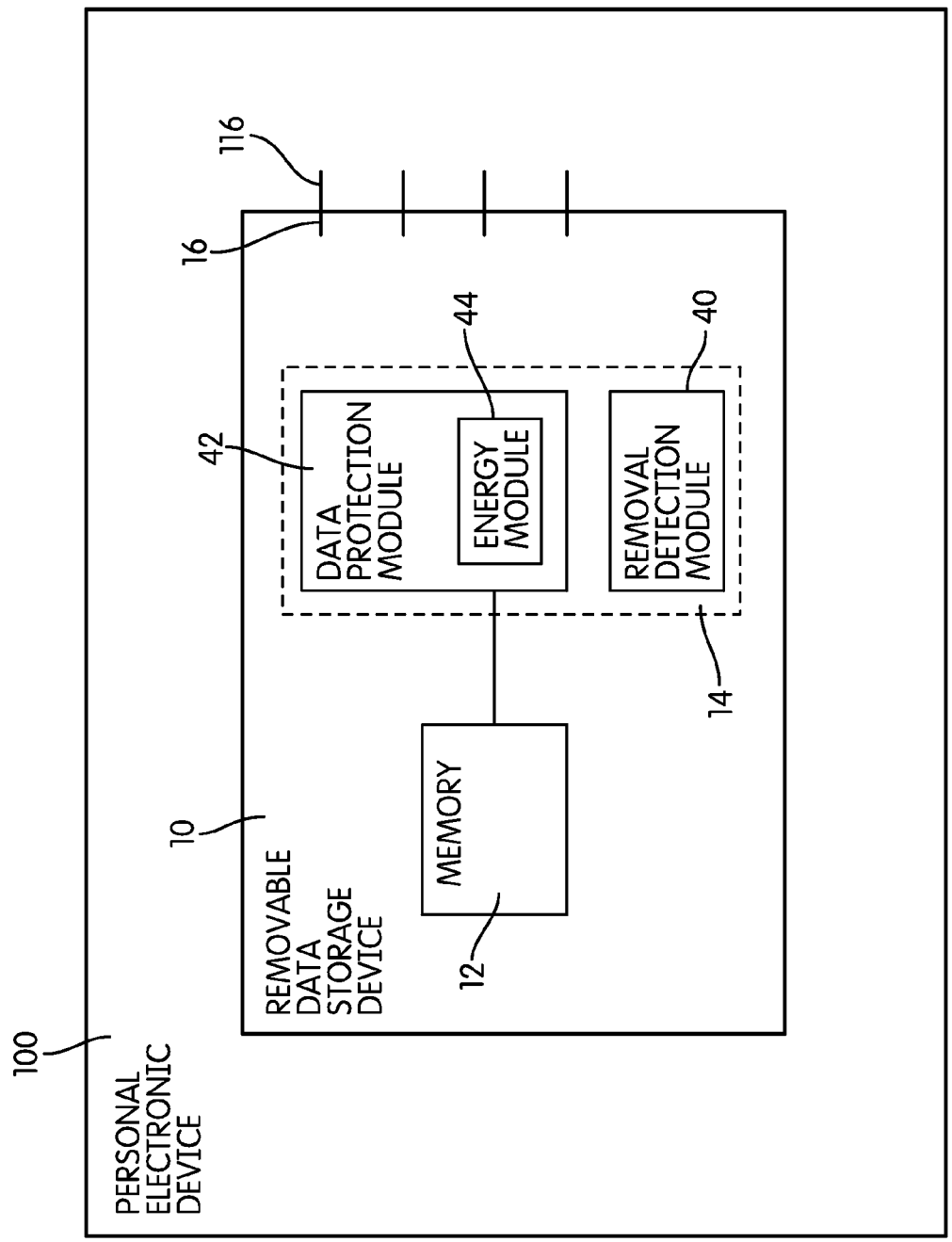
Figure 4C:
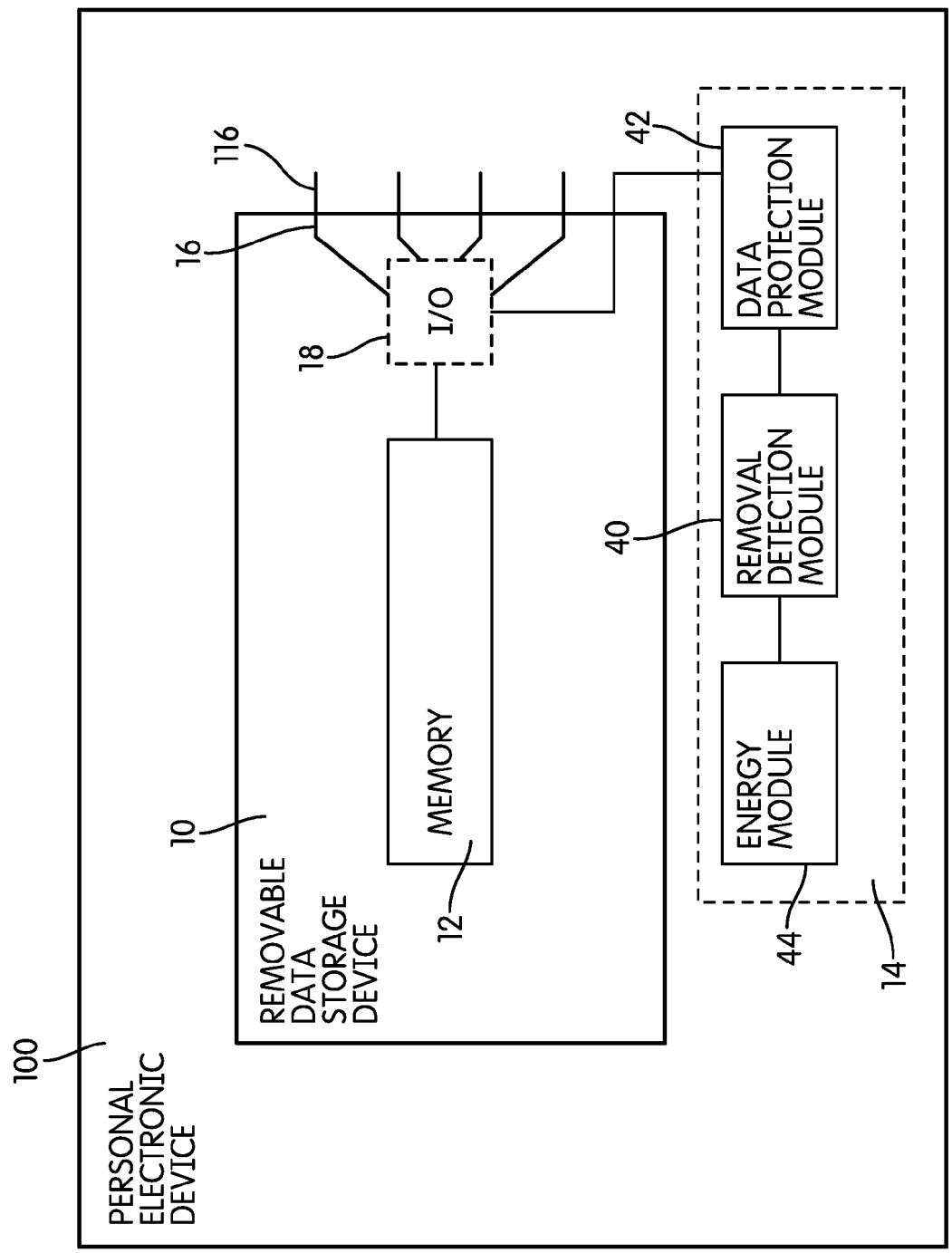

Referring to FIG. 4C, the personal electronic device 100 may include an energy module 44 configured to provide power to the data protection module 42. According to various embodiments, the energy module 44 may include a battery, a capacitor, or any other suitable power supply. The battery may be the general power supply 112 for the personal electronic device 100, or may be a separate dedicated battery. Referring to FIG. 4A, the personal electronic device 100 may include an energy module 44' which corresponds to an energy module 44 located on the removable data storage device 10. For example, energy modules 44, 44' may each include a portion of an inductor, which is configured to inductively couple energy or power to the data protection module 42.

Figure 4D:
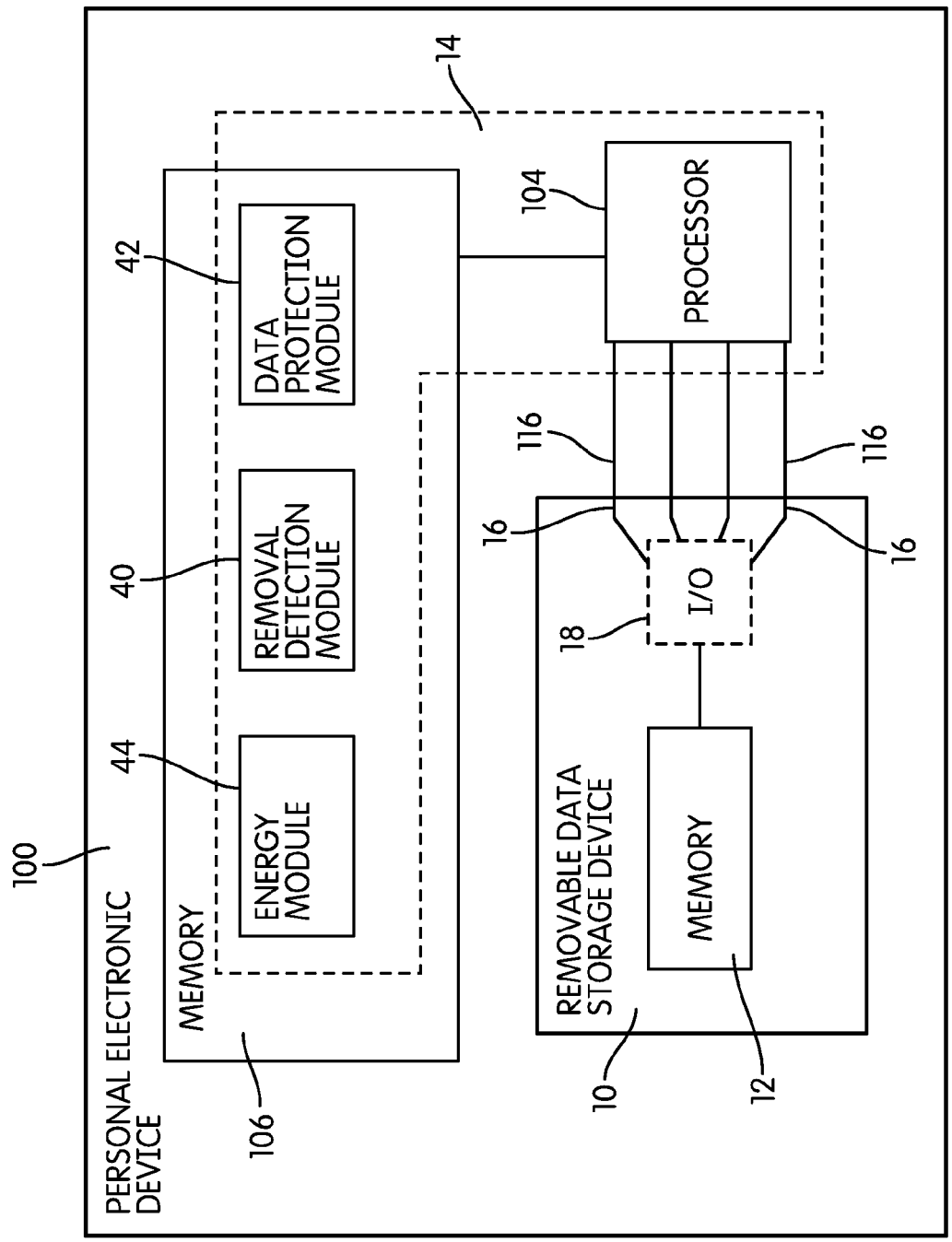
Figure 5A:
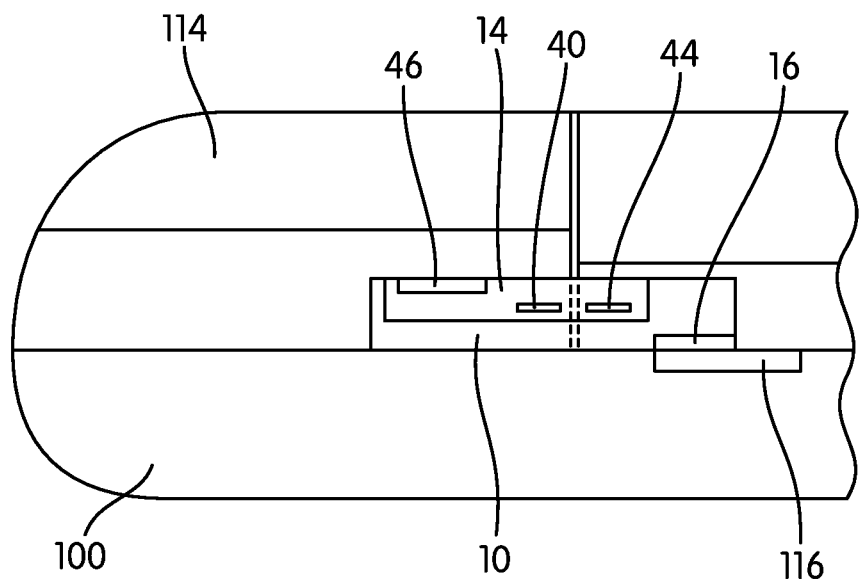
FIGS. 5A-5D are detailed schematic block diagrams of a cross-sectional side-elevation view of the removable data storage device and personal electronic device of FIG. 1, shown according to other embodiments.
Figure 5B:
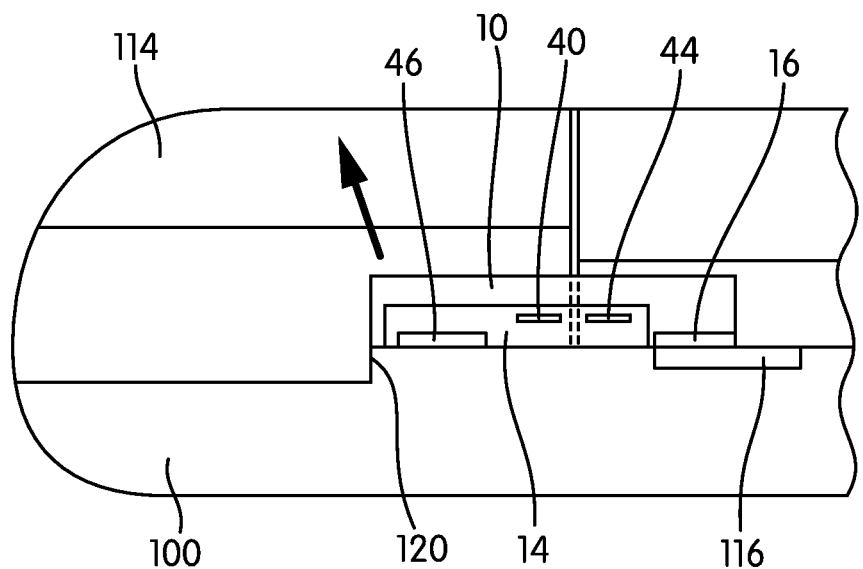
Figure 5C:
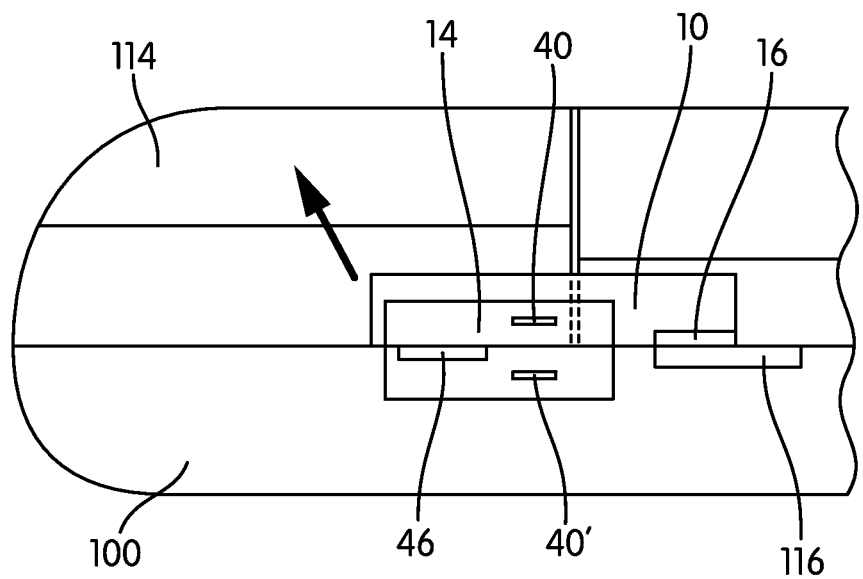
Figure 5D:
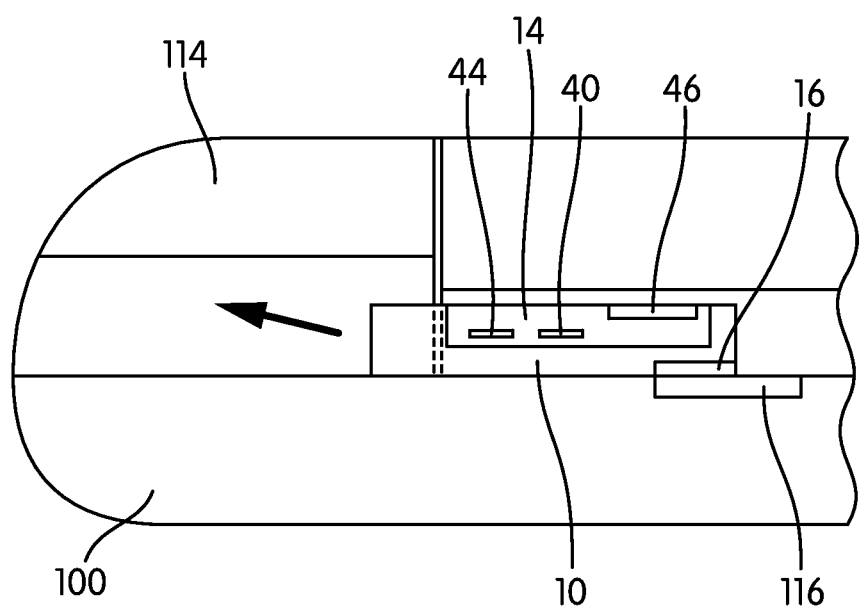

Referring to FIGS. 4A, 4B, and 4D, the data storage device 10 includes an energy module 44 configured to provide power to the data protection module 42. Providing an energy module 44 on the removable data storage device 10 enables the data protection module 42 to protect the data stored in memory 12 even after the removable data storage device 10 has been removed from the personal electronic device 100. The energy module 44 may include a battery, a capacitor, a photoelectric cell 46, or any other suitable power supply. For example, the energy module 44 may be configured to convert environmental energy (e.g., an electromagnetic stimulus, a kinetic stimulus, an ultrasonic stimulus, etc.) into useable energy. According to one embodiment, an energy module 44' on the personal electronic device 100 may transmit infrared, microwave, or other electromagnetic impulse to a receiving energy module 44 on the removable data storage device 10. According to another embodiment, the personal electronic device 100 may transmit ultrasonic waves which are converted to useable energy via piezo elements in the energy module 44 on board the removable data storage device 10. According to various embodiments, the energy modules 44 may have stored in them before and/or after the removable data storage device 10 is installed into the personal electronic device 100. For example, a battery or capacitor on the removable data storage device 10 may be charged at the factory or otherwise separately from the personal electronic device 100. The removable data storage device 10 may be configured to charge a battery or capacitor in the energy module 44 using power from the personal electronic device 100.

It should be noted that not all elements or modules shown in a Figure are required, even though some Figures show multiple elements or modules for the sake of space. Furthermore, it is contemplated that one module may perform the tasks described by two modules above. For example, referring to FIG. 4B, the data protection module 42 may include an energy module 44.

Figure 8:
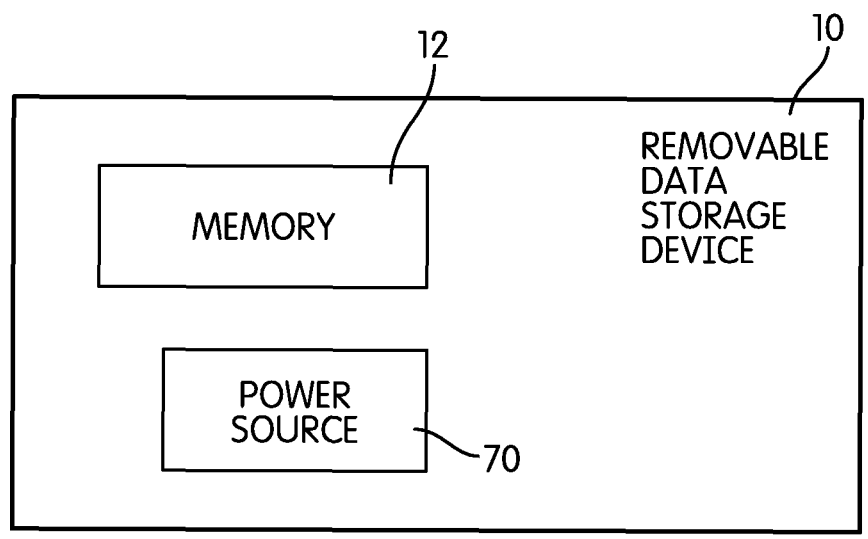
FIG. 8 is a detailed block diagram of a removable data storage device, shown according to another embodiment.

Referring to FIG. 8, the removable data storage device 10 is shown according to another exemplary embodiment. As shown, the removable data storage device 10 includes a memory 12 and a power source 70. The power source 70 may include one or more energy storage components (e.g., a battery, a capacitor, etc.). The power source 70 may be configured to convert environmental energy (e.g., a light stimulus, an electromagnetic stimulus, a kinetic stimulus, an ultrasonic stimulus, etc.) into useable energy. According to one embodiment, the power source 70 may include a photoelectric cell 46. According to another embodiment, the power source 70 may convert infrared, microwave, or other electromagnetic impulse into usable energy. According to another embodiment, the power source 70 may use piezo elements to convert ultrasonic waves into useable energy.

Figure 9:
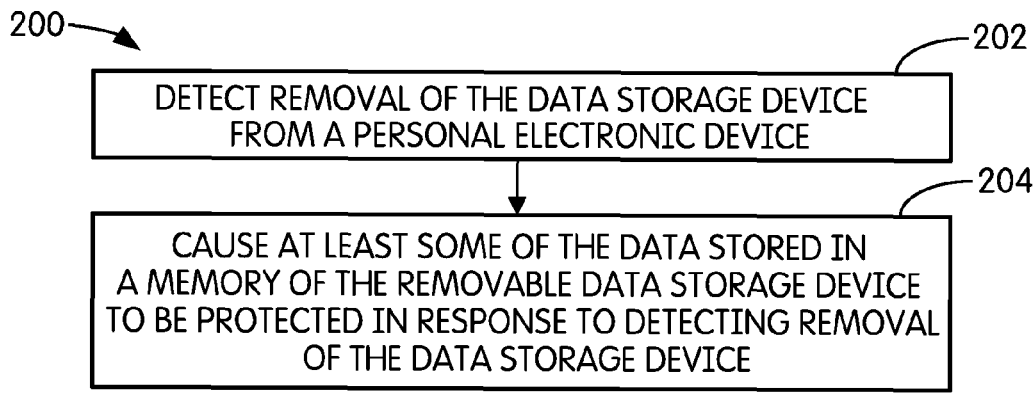
FIG. 9 is a flowchart of a process for protecting data stored in a memory of a removable data storage device, shown according to an exemplary embodiment.

Referring to FIG. 9, a flowchart of process 200 for protecting data stored in a memory 12 of the removable data storage device 10 is shown, according to an exemplary embodiment. Process 200 is shown to include the steps of detecting removal of the data storage device 10 from a personal electronic device 100 (step 202) and causing at least some of the data stored in the memory 12 of the removable data storage device 10 to be protected in response to detecting removal of the data storage device 10 (step 204).

Figure 10:
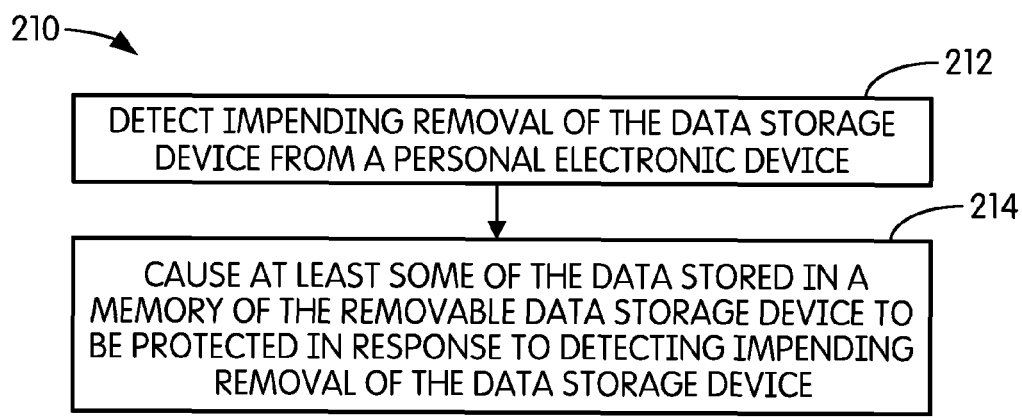
FIG. 10 is a flowchart of a process for protecting data stored in a memory of a removable data storage device, shown according to another embodiment.

Referring to FIG. 10, a flowchart of process 210 for protecting data stored in a memory 12 of the removable data storage device 10 is shown, according to an exemplary embodiment. Process 210 is shown to include the steps of detecting impending removal of the data storage device 10 from a personal electronic device 100 (step 212) and causing at least some of the data stored in the memory 12 of the removable data storage device 10 to be protected in response to detecting impending removal of the data storage device 10 (step 214).

Figure 11:
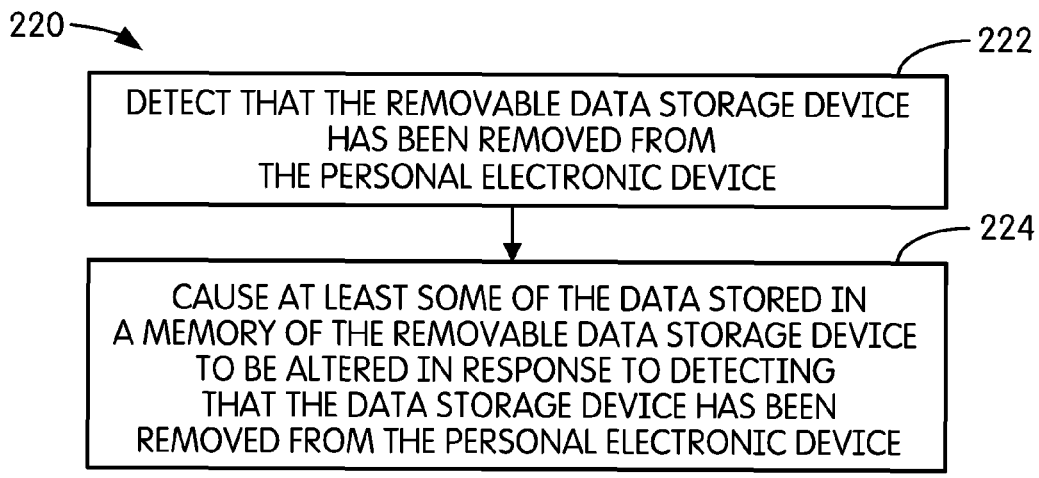
FIG. 11 is a flowchart of a process for protecting data stored in a memory of a removable data storage device, shown according to another embodiment.

Referring to FIG. 11, a flowchart of process 220 for protecting data stored in a memory 12 of the removable data storage device 10 is shown, according to an exemplary embodiment. Process 220 is shown to include the steps of detecting that the data storage device 10 has been removed from a personal electronic device 100 (step 222) and causing at least some of the data stored in the memory 12 of the removable data storage device 10 to be altered in response to detecting that the data storage device 10 has been removed from the personal electronic device (step 224).

Figure 12:
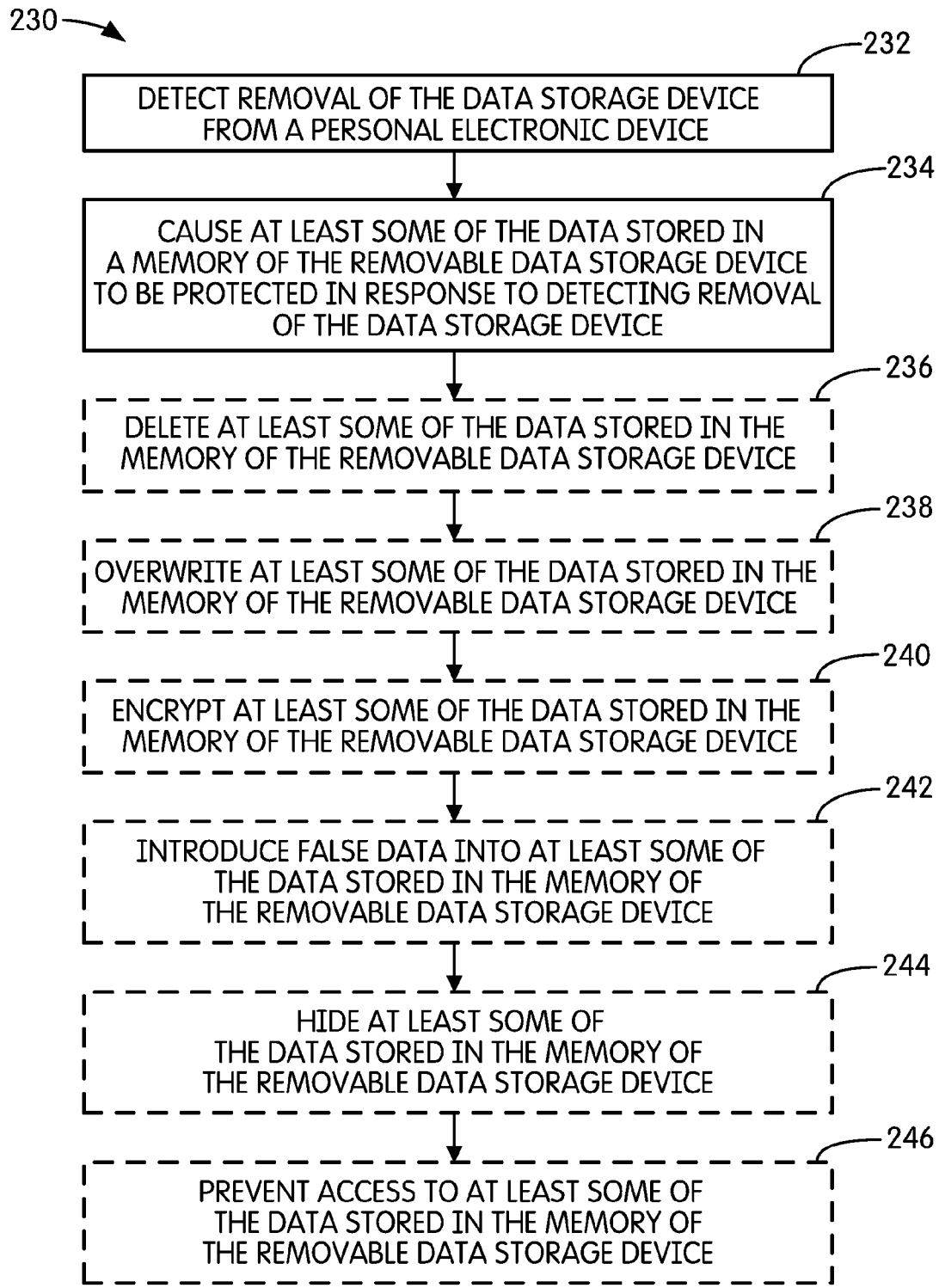
FIG. 12 is a flowchart of a process for protecting data stored in a memory of a removable data storage device, shown according to another embodiment.

Referring to FIG. 12, a flowchart of process 230 for protecting data stored in a memory 12 of the removable data storage device 10 is shown, according to an exemplary embodiment. Process 230 is shown to include the steps of detecting removal of the data storage device 10 from a personal electronic device 100 (step 232) and causing at least some of the data stored in the memory 12 of the removable data storage device 10 to be protected in response to detecting removal of the data storage device 10 (step 234). Process 230 may further include one or more of the steps of deleting at least some of the data stored in the memory 12 of the removable data storage device 10 (step 236), overwriting at least some of the data stored in the memory 12 of the removable data storage device 10 (step 238), encrypting at least some of the data stored in the memory 12 of the removable data storage device 10 (step 240), introducing false data into at least some of the data stored in the memory 12 of the removable data storage device 10 (step 242), hiding at least some of the data stored in the memory 12 of the removable data storage device 10 (step 244), and preventing access to at least some of the data stored in the memory 12 of the removable data storage device 10 (step 246). It should be noted that these steps may be performed, if at all, in any order, including simultaneously. For example, according to one embodiment, process 230 may encrypt some of the data stored in memory 12 and then delete the encryption key and hide the data (e.g., by deleting memory pointers 20).

Figure 13:
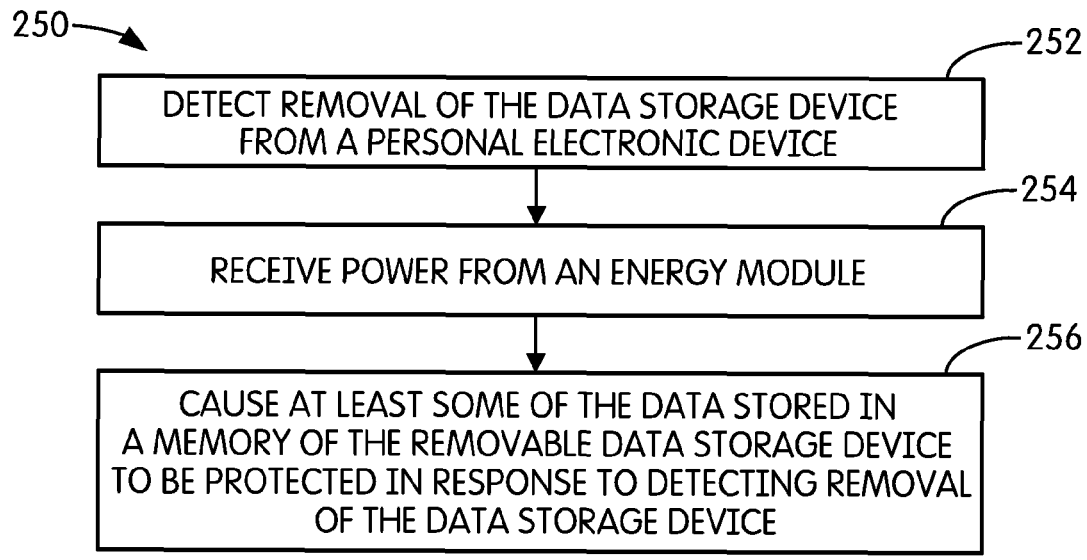
FIG. 13 is a flowchart of a process for protecting data stored in a memory of a removable data storage device, shown according to another embodiment.

Referring to FIG. 13, a flowchart of process 250 for protecting data stored in a memory 12 of the removable data storage device 10 is shown, according to an exemplary embodiment. Process 250 is shown to include the steps of detecting removal of the data storage device 10 from a personal electronic device 100 (step 252), receiving power from an energy module 44 (step 254), and causing at least some of the data stored in the memory 12 of the removable data storage device 10 to be protected in response to detecting removal of the data storage device 10 (step 256).

Figure 14:
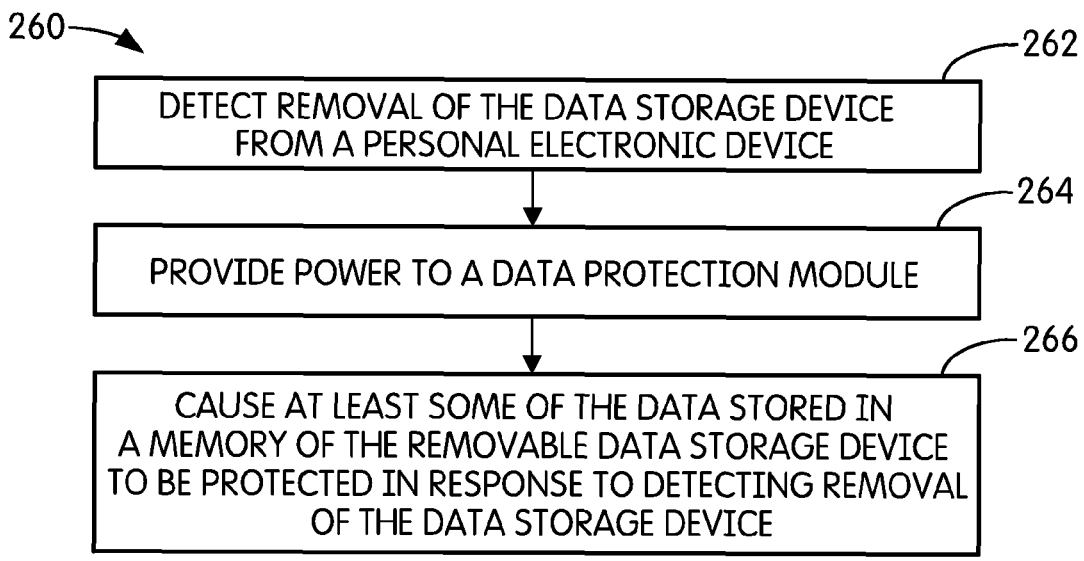
FIG. 14 is a flowchart of a process for protecting data stored in a memory of a removable data storage device, shown according to another embodiment.

Referring to FIG. 14, a flowchart of process 260 for protecting data stored in a memory 12 of the removable data storage device 10 is shown, according to an exemplary embodiment. Process 260 is shown to include the steps of detecting removal of the data storage device 10 from a personal electronic device 100 (step 262), providing power to a data protection module 42 (step 264), and causing at least some of the data stored in the memory 12 of the removable data storage device 10 to be protected in response to detecting removal of the data storage device 10 (step 266).

Figure 15:
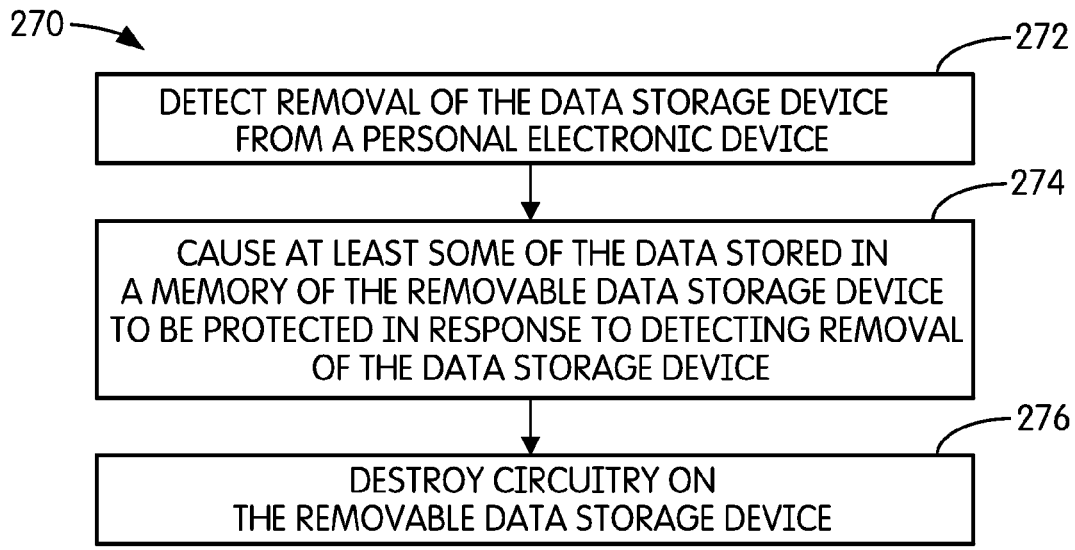
FIG. 15 is a flowchart of a process for protecting data stored in a memory of a removable data storage device, shown according to another embodiment.

Referring to FIG. 15, a flowchart of process 270 for protecting data stored in a memory 12 of the removable data storage device 10 is shown, according to an exemplary embodiment. Process 270 is shown to include the steps of detecting removal of the data storage device 10 from a personal electronic device 100 (step 272), causing at least some of the data stored in the memory 12 of the removable data storage device 10 to be protected in response to detecting removal of the data storage device 10 (step 274), and destroying circuitry on the removable data storage device (step 276). According to various embodiments, the destroyed circuitry may include a processor (e.g., which may be part of circuit 14, etc.), a sensor, a portion of the memory 12, or an antenna 80. According to other embodiments, the steps of causing data to be protected (step 274) and destroying circuitry (step 276) may happen in simultaneously or in reverse order.

Figure 16:
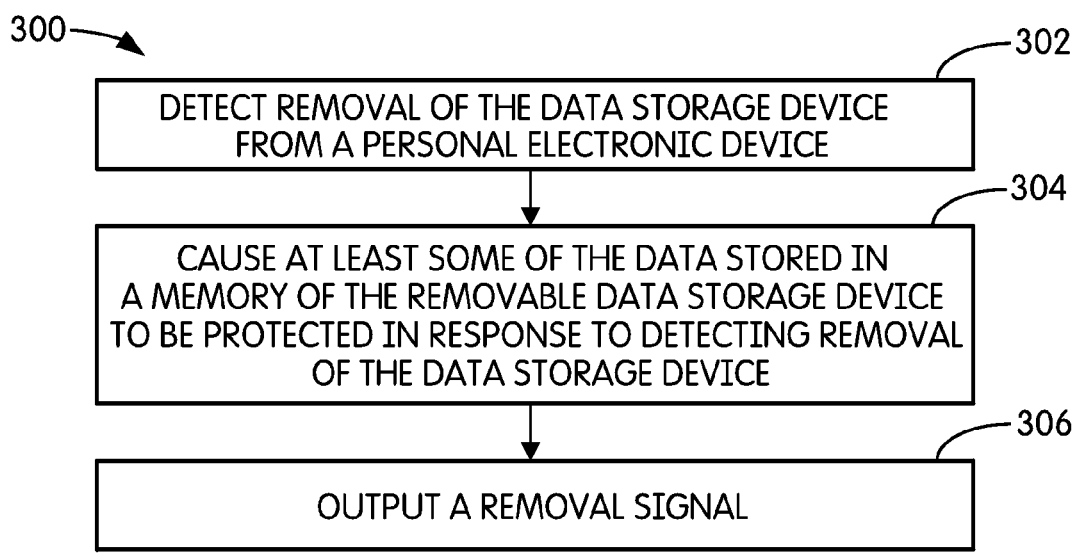
FIG. 16 is a flowchart of a process for protecting data stored in a memory of a removable data storage device, shown according to another embodiment.

Referring to FIG. 16, a flowchart of process 300 for protecting data stored in a memory 12 of the removable data storage device 10 is shown, according to an exemplary embodiment. Process 300 is shown to include the steps of detecting removal of the data storage device 10 from a personal electronic device 100 (step 302), causing at least some of the data stored in the memory 12 of the removable data storage device 10 to be protected in response to detecting removal of the data storage device 10 (step 304), and outputting a removal signal (step 306). According to various embodiments, the removal signal may be output from the removable data storage device 10 or the personal electronic device 100. For example, the personal electronic device 100 may send (e.g., transmit, etc.) a removal signal to the removable data storage device 10, either wired (e.g., via data contacts 16) or wirelessly (e.g., via antenna 108, an inductor, etc.), indicating that the removable data storage device 10 is about to be, is being, or has been removed. Similarly, the removable data storage device 10 may send (e.g., transmit, etc.) a removal signal to the personal electronic device 100, either wired (e.g., via data contacts 16) or wirelessly (e.g., via antenna 80, an inductor, etc.), indicating that the removable data storage device 10 is about to be, is being, or has been removed. According to other embodiments, the removal signal may stay internal to either the removable data storage device 10 or the personal electronic device 100. According to various embodiments, the removal signal may be electrical, optical, electromagnetic (e.g., infrared, radio frequency, etc.), acoustic (e.g., ultrasonic, etc.), etc. According to various embodiments, the removal signal may be a human-perceivable alert, for example, an audible alert (e.g., a beep, a siren, etc.), a visual alert (e.g., an illuminated light, a flashing light, an image on a display, etc.), or a haptic alert (e.g., a vibration). According to various other embodiments, the removable data storage device 10 and/or the personal electronic device 100 may send a removal signal to a third device. According to one embodiment, the removal signal from the removable data storage device 10 to the personal electronic device 100 may cause the personal electronic device 100 to transmit a message. For example, the personal electronic device 100 may send a message which may indicate to the owner, user, service provider, etc., that the removable data storage device 10 is about to be, is being, or has been removed from the personal electronic device 100. The message may be through any suitable mode of communication (e.g., a text message, an email, a telephone call, connecting to a remote server, for example, over the interne, through a wired or wireless network, etc.). The message may simply indicate that the removable data storage device 10 is about to be, is being, or has been removed from the personal electronic device 100, or the message may include additional information (e.g., time and/or date information, location information, GPS coordinates, cell tower information, etc.). It is further contemplated that the removable data storage device 10 may be configured to send the removal signal to a third component directly, for example, via antenna 80.

Figure 17:
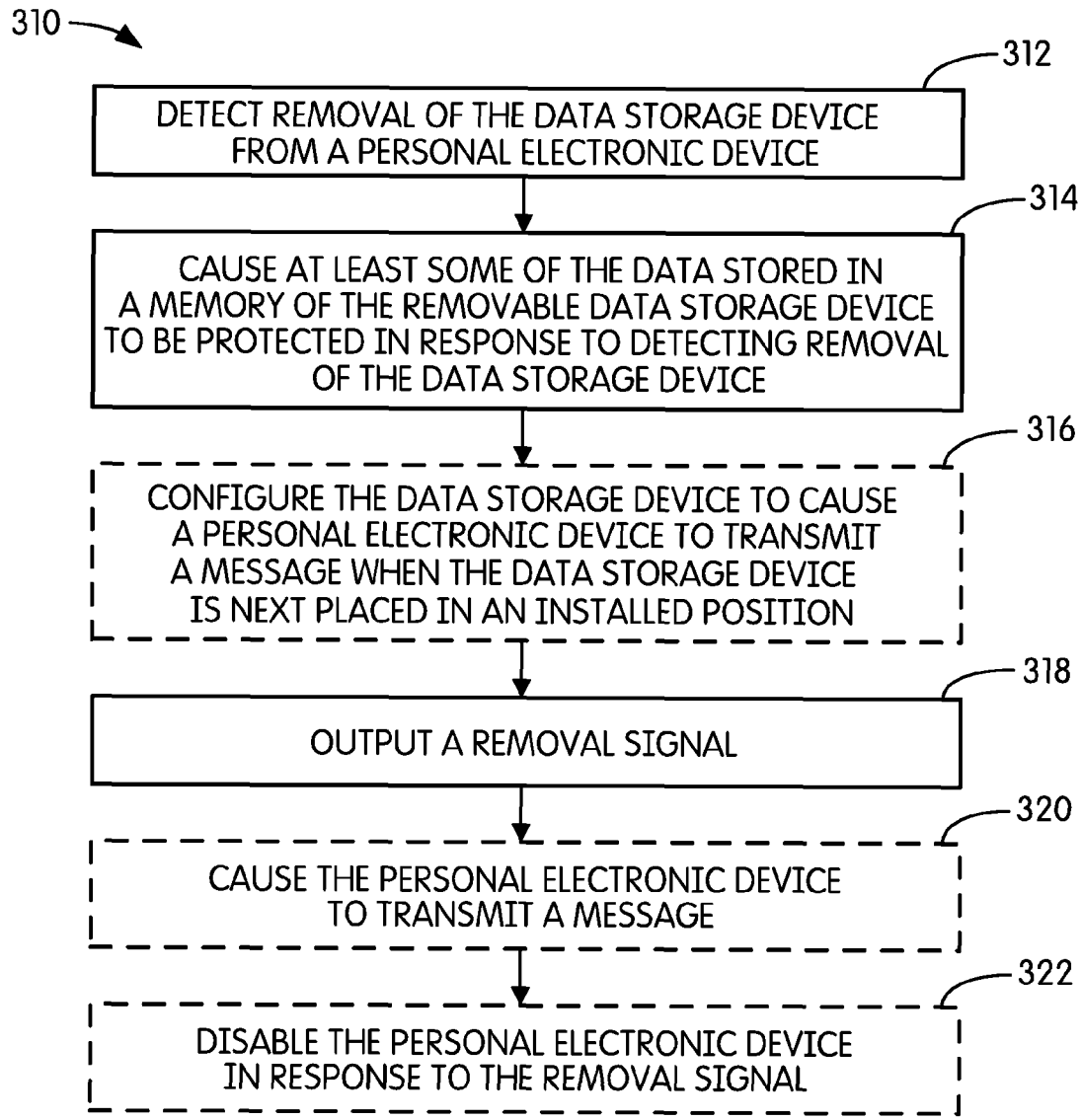
FIG. 17 is a flowchart of a process for protecting data stored in a memory of a removable data storage device, shown according to another embodiment.

Referring to FIG. 17, a flowchart of process 310 for protecting data stored in a memory 12 of the removable data storage device 10 is shown, according to an exemplary embodiment. Process 310 is shown to include the steps of detecting removal of the data storage device 10 from a personal electronic device 100 (step 312), causing at least some of the data stored in the memory 12 of the removable data storage device 10 to be protected in response to detecting removal of the data storage device 10 (step 314), and outputting a removal signal (step 318).

Process 310 may include the step of configuring the data storage device 10 to cause a personal electronic device 100 to transmit a message when the data storage device 10 is next placed in an installed position (step 316). For example, the removable data storage device 10 may not be able to communicate with the personal electronic device 100 after the removable data storage device 10 has been removed from the personal electronic device 100 because the personal electronic device 100 has been turned off, the removable data storage device 10 does not have an antenna 80, etc. Accordingly, the removable data storage device 10 may configure itself to cause the next personal electronic device it is inserted into to send a message. According to one embodiment, a module (e.g., computer code, self-executing computer code, etc.) may be stored in the memory 12 of the removable data storage device 10. According to another embodiment, the circuit 14 may be configured to cause the message to be sent.

Process 310 may include the step of causing the personal electronic device 100 to transmit a message (step 320). According to one embodiment, the removal signal may be output from the removable data storage device 10 to the personal electronic device 100 after the removable data storage device 10 has been reinserted into the personal electronic device 100, thus causing the personal electronic device 100 to transmit the message.

Process 310 may include the step of disabling the personal electronic device 100 in response to the removal signal (step 322). For example, the personal electronic device 100 may be permanently disabled, disabled for a period of time, or re-enabled in response to a re-enablement signal. The re-enablement signal may include a password, signal from a service provider, etc. Disablement may include complete disablement of the personal electronic device 100 or disablement of particular features. For example, process 310 may disable the antenna 108, the data contacts 116, etc. Disabling the antenna 108 would make a smart phone embodiment of the personal electronic device 100 less than useful to a user. Disabling the data contacts 116 may prevent, for example, a virus or other fraudulent data added to the removable data storage device 10 by a remover of the removable data storage device from affecting a rightful user of the personal electronic device 100.

In further regards to the above described systems and methods, it is contemplated that a user may want to remove the removable data storage device 10 from the personal electronic device 100 without protecting the data stored in the memory 12, or at least not protecting the data to the extent of deleting the data or otherwise making the data hard to retrieve. Thus, the data protection system may include an authorization system for preauthorizing removal of the removable data storage device 10 from the personal electronic device 100. The authorization system may include a module or other computer code stored on the removable data storage device 10 (e.g., in memory 12, in circuit 14, etc.) or the personal electronic device 100 and executed by the removable data storage device 10 or the personal electronic device 100, or some combination thereof. According to one embodiment, the authorization system may be configured as an "app" on a smart phone. The authorization system may be preauthorized (e.g., put in a preauthorized state, setting a preauthorized state flag, etc.) by a user input, for example, via the user input device 110 on the personal electronic device 100. The user input device 110 may include a keypad, a keyboard, a touch sensitive screen, a toggle switch, a rotary selector, a trackball, a camera, a fingerprint scanner, etc., and the user input may include a password or biometric identification, (e.g., a fingerprint, a retinal scan, facial recognition, etc.). For example, a user may take a picture of themselves using a camera coupled to the personal electronic device 100, and the authorization system uses facial recognition software to preauthorize removal of the removable data storage device 10 from the personal electronic device 100. Certain data stored in the memory of the removable data storage device 10 may be preserved in response to the authorization system being in a preauthorized state. According to one embodiment, the preauthorized state may reset after a time interval. For example, if a user preauthorizes removal, but does not remove the removable data storage device 10 in a certain period of time (e.g., 10 seconds, 30 seconds, 1 minute, 2 minutes, 5 minutes, etc.), the preauthorized state may reset. Thus, the user may be protected from leaving a preauthorizing removable data storage device 10 in a personal electronic device 100, for example, due to distractedness or forgetfulness.

Figure 18:
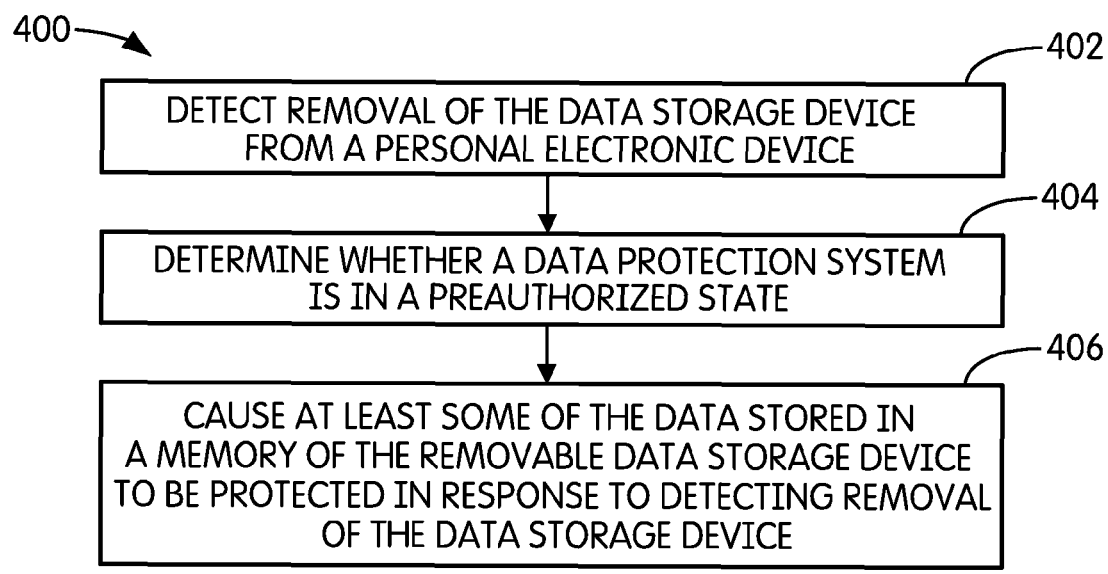
FIG. 18 is a flowchart of a process for protecting data stored in a memory of a removable data storage device, shown according to another embodiment.

Referring to FIG. 18, a flowchart of process 400 for protecting data stored in the memory 12 of the removable data storage device 10 is shown, according to an exemplary embodiment. Process 400 is shown to include the steps of detecting removal of the data storage device 10 from a personal electronic device 100 (step 402), determining whether a data protection system is in a preauthorized state (step 404), and causing at least some of the data stored in a memory of the removable data storage device to be protected based on detecting removal and on whether a data protection system is in a preauthorized state (step 406).

Figure 19:
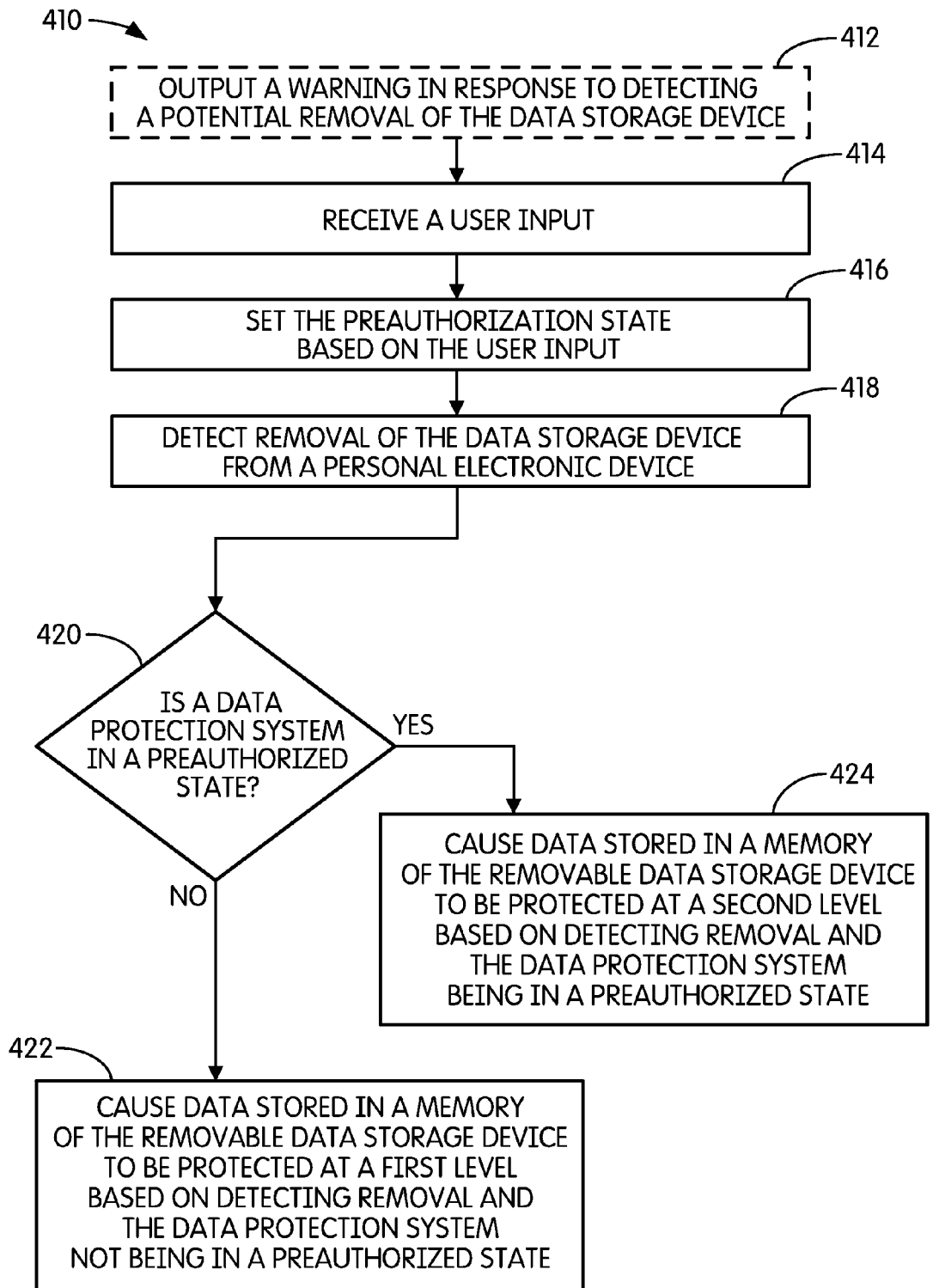
FIG. 19 is a flowchart of a process for protecting data stored in a memory of a removable data storage device, shown according to another embodiment.

Referring to FIG. 19, a flowchart of process 410 for protecting data stored in the memory 12 of the removable data storage device 10 is shown, according to an exemplary embodiment. Process 410 may include outputting a warning in response to detecting potential removal of the removable data storage device 10 (step 412). According to various embodiments, the warning may simply be an alert, the warning may prompt the user to preauthorize removal of the removable data storage device 10, etc. Process 410 is shown to include the steps of receiving a user input (step 414), setting the preauthorization state based on the user input (step 416), and detecting removal of the data storage device 10 from the personal electronic device 100 (step 418). Process 410 then determines if the data protection system is in a preauthorized state (step 420). If the data protection system is not in a preauthorized state, then process 410 proceeds to the step of causing data stored in a memory of the removable data storage device to be protected at a first level (step 422). If the data protection system is in a preauthorized state, then process 410 proceeds to the step of causing data stored in a memory of the removable data storage device to be protected at a second level (step 424). The first and second levels of protection each may include on or more of encrypting data, deleting data, hiding data, and overwriting data. According to one embodiment, the second level of protection differs from the first level of protection. According to preferred embodiments, the first level of protection is more secure or severe than the second level of protection. For example, according to one embodiment, the first level of protection includes deleting data, and the second level of protection includes encrypting data. According to another embodiment, the first level of protection may include encrypting or hiding data, and the second level of protection may include doing nothing. For example, if the data stored in the memory 12 is already encrypted, the first level of protection may hide the data, and the second level of encryption simply leaves the stored data in its encrypted state.

Referring generally to FIGS. 12-18, according to some embodiments, the detecting step 232, 252, 262, 272, 302, 312, 402 includes detecting impending removal of the data storage device, and the causing step 234, 256, 266, 274, 304, 314, 406 includes causing at least some of the data to be protecting in response to detecting the impending removal. According to other embodiments, the detecting step 232, 252, 262, 272, 302, 312, 402 includes detecting that the data storage device has been removed, and the causing step 234, 256, 266, 274, 304, 314, 406 includes causing at least some of the data to be protecting in response to detecting that the data storage device has been removed.

It is also important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present inventions. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for protecting data stored in a removable data storage device, comprising:
   a personal electronic device;
   a removable solid state data storage device operatively coupled to the personal electronic device; and
   a circuit configured to protect data stored in the data storage device by performing a protective action on the data using power from the personal electronic device in response to detecting impending removal of the data storage device from the personal electronic device;
   wherein the protective action includes at least one of deleting the data, overwriting the data, encrypting the data, requiring a password, or hiding the data.

2. The system of claim 1, wherein the personal electronic device comprises at least one of a mobile phone, a smart phone, a personal digital assistant, and a pager.

3. The system of claim 1, wherein the personal electronic device comprises at least one of a personal computer, a laptop computer, a tablet computer, and a handheld computer.

4. The system of claim 1, wherein the personal electronic device comprises at least one of a camera and an audio recording device.

5. The system of claim 1, wherein the removable data storage device comprises a Subscriber Identity Module (SIM).

6. The system of claim 1, wherein the removable data storage device comprises at least one of a Secure Digital (SD) memory card, an integrated circuit (IC) memory, a Universal Serial Bus (USB) drive, a Universal Integrated Circuit Card (UICC), and a Removable User Identity Module (R-UIM).

7. The system of claim 1, wherein the circuit is disposed on the personal electronic device.

8. The system of claim 1, wherein the circuit is disposed on the data storage device.

9. The system of claim 1, wherein the circuit comprises a removal detection module, the removal detection module configured to detect impending removal of the data storage device.

10. The system of claim 1, wherein the circuit comprises a data protection module configured to perform the protective action.

11. A removable data storage device comprising:
a circuit configured to respond to detecting impending removal of the removable data storage device from a personal electronic device by performing a protective action on data stored in the removable storage device using;
wherein the protective action includes at least one of, deleting the data, overwriting the data, encrypting the data, requiring a password, or hiding the data.

12. The removable data storage device of claim 11, wherein the removable data storage device comprises a Subscriber Identity Module (SIM).

13. The removable data storage device of claim 11, wherein the removable data storage device comprises at least one of a Secure Digital (SD) memory card, an integrated circuit (IC) memory, a Universal Serial Bus (USB) drive, a Universal Integrated Circuit Card (UICC), and a Removable User Identity Module (R-UIM).

14. The removable data storage device of claim 11, wherein the circuit comprises a removal detection module, the removal detection module being configured to detect impending removal of the removable data storage device.

15. The removable data storage device of claim 11, wherein the circuit comprises a data protection module configured to perform the protective action.

16. A personal electronic device, comprising:
a circuit configured to protect data stored in a removable solid state data storage device by performing a protective action on the data using power from the personal electronic device in response to detecting impending removal of the data storage device from the personal electronic device;
wherein the protective action includes at least one of deleting the data, overwriting the data, encrypting the data, requiring a password, or hiding the data.

17. The personal electronic device of claim 16, wherein the personal electronic device comprises at least one of a mobile phone, a smart phone, a personal digital assistant, and a pager.

18. The personal electronic device of claim 16, wherein the personal electronic device comprises at least one of a personal computer, a laptop computer, a tablet computer, and a handheld computer.

19. The personal electronic device of claim 16, wherein the personal electronic device comprises at least one of a camera and an audio recording device.

20. The personal electronic device of claim 16, wherein the circuit comprises a removal detection module, the removal detection module configured to detect impending removal of the data storage device from the personal electronic device.

21. The personal electronic device of claim 20, wherein the removal detection module is configured to detect removal of a cover from the personal electronic device.

22. The personal electronic device of claim 20, wherein the removal detection module is configured to detect disruption of a magnetic link between the personal electronic device and the data storage device.

23. The personal electronic device of claim 20, wherein the removal detection module is configured to detect a change in mutual capacitance between the personal electronic device and the data storage device.

24. The personal electronic device of claim 20, wherein the removal detection module is configured to detect a change in mutual inductance between the personal electronic device and the data storage device.

25. The personal electronic device of claim 20, wherein the removal detection module is configured to detect a differential acceleration between the personal electronic device and the data storage device.

26. The personal electronic device of claim 20, wherein the removal detection module is configured to detect a change in temperature.

27. The personal electronic device of claim 20, wherein the removal detection module is configured to detect exposure to light.

28. The personal electronic device of claim 20, wherein the removal detection module is configured to detect making of an electrical contact.

29. The personal electronic device of claim 20, wherein the removal detection module is configured to detect making of a mechanical contact.

30. The personal electronic device of claim 20, wherein the removal detection module is configured to detect breaking of an electrical contact.

31. The personal electronic device of claim 30, wherein the electrical contact couples the personal electronic device to the data storage device.

32. The personal electronic device of claim 30, wherein the electrical contact is configured such that the electrical contact must be broken in order to physically access the data storage device.

33. The personal electronic device of claim 20, wherein the removal detection module is configured to detect breaking of a mechanical contact.

34. The personal electronic device of claim 33, wherein the mechanical contact couples the personal electronic device to the data storage device.

35. The personal electronic device of claim 33, wherein the mechanical contact is configured such that the mechanical contact must be broken in order to physically access the data storage device.

* * * * *